(12) United States Patent
Mayer

(10) Patent No.: US 11,588,547 B2
(45) Date of Patent: Feb. 21, 2023

(54) SEAM ABSTRACTION IN COMMUNICATIONS NETWORKS

(71) Applicant: Michael Mayer, Ottawa (CA)

(72) Inventor: Michael Mayer, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 17/082,560

(22) Filed: Oct. 28, 2020

(65) Prior Publication Data
US 2022/0131601 A1 Apr. 28, 2022

(51) Int. Cl.
| | | |
|---|---|---|
| H04B 7/185 | (2006.01) | |
| H04L 45/28 | (2022.01) | |
| H04L 45/02 | (2022.01) | |
| H04W 80/02 | (2009.01) | |
| H04W 76/12 | (2018.01) | |
| H04W 36/30 | (2009.01) | |
| H04L 45/00 | (2022.01) | |

(52) U.S. Cl.
CPC ........ *H04B 7/18526* (2013.01); *H04L 45/02* (2013.01); *H04L 45/22* (2013.01); *H04L 45/28* (2013.01); *H04W 36/305* (2018.08); *H04W 76/12* (2018.02); *H04W 80/02* (2013.01)

(58) Field of Classification Search
CPC ................................. H04B 7/15; H04L 45/00
See application file for complete search history.

(56) References Cited

U.S. PATENT DOCUMENTS

| | | | |
|---|---|---|---|
| 6,574,227 B1 | 6/2003 | Rosenberg et al. | |
| 6,751,190 B1 * | 6/2004 | Swallow | H04L 45/28 370/242 |
| 8,799,554 B1 * | 8/2014 | Vincent | G06F 9/5016 718/107 |

(Continued)

FOREIGN PATENT DOCUMENTS

| | | | |
|---|---|---|---|
| CN | 105227483 A | | 1/2016 |
| JP | 2020123910 A | * | 8/2020 |
| WO | 2005034442 A1 | | 4/2005 |

OTHER PUBLICATIONS

Wang et al., "Analysis on Connectivity of Inter-Orbit-Links in a MEO/LEO Couble Layer Satellite Network", Chinese Journal of Aeronautics, vol. 19, No. 4, pp. 340-345, Nov. 2006.

(Continued)

*Primary Examiner* — Afshawn M Towfighi

(57) ABSTRACT

A method for routing data in a network includes receiving, by a first network node, data to be routed using a first layer protocol to a second network node where the first network node is intermittently connected to the second network node over a link spanning a portion of the network. The first network node determines that the link fails to meet a communications criteria and encapsulates the data using a second layer protocol to produce encapsulated data. The second layer protocol is transparent to the first layer protocol and the encapsulated data includes connectivity instructions to route the encapsulated data to the second network node via a third network node. The second network node and the third network node are in communication across the portion of the network and the first network node is able to transmit the encapsulated data to the third network node.

20 Claims, 31 Drawing Sheets

(56) References Cited

U.S. PATENT DOCUMENTS

| | | | | |
|---|---|---|---|---|
| 2007/0081465 | A1* | 4/2007 | Puppa | H04L 43/0811 |
| | | | | 370/241.1 |
| 2007/0271032 | A1* | 11/2007 | Cheng | G01S 13/66 |
| | | | | 701/2 |
| 2010/0322240 | A1 | 12/2010 | Troxel et al. | |
| 2012/0134261 | A1* | 5/2012 | Natarajan | H04B 7/1856 |
| | | | | 370/225 |
| 2022/0014265 | A1* | 1/2022 | Greenidge | H04B 7/1851 |

OTHER PUBLICATIONS

Yeo et al., "An approach to the modeling of counter-rotating seam communication links for LEO satellite systems", IEEE Communications Society, pp. 2016-2020, WCNC 2004.

Werner et al., A Neural network approach to distributed adaptive routing of LEO intersatellite link traffic, VTC, pp. 1498-1502, 1998.

Soret et al., "Autonomous Routing for LEO Satellite Constellations with Minimum Use of Inter-Plane Links", IEEE International Conference on Communications (ICC), Aalborg University, Denmark, May 2019.

Wood et al., "IP Routing Issues In Satellite Constellation Networks", International Journal of Satellite Communications, vol. 18, No. 6, Nov./Dec. 2000.

* cited by examiner

SEAM ABSTRACTION IN COMMUNICATIONS NETWORKS

CROSS-REFERENCE TO RELATED APPLICATIONS

This is the first application filed for the present invention.

FIELD OF THE INVENTION

The present invention pertains to data networks, such as but not necessarily limited to satellite mesh networks, and in particular to a method and apparatus for communicating across a portion of the network that has a dynamically changing topology.

BACKGROUND

In the field of packet communications and networking, some network topologies are fixed while others may have a dynamically changing topology. An example of networks with a dynamically changing topology are non-terrestrial (satellite) networks used to provide global communications services where the satellite orbits may result in a satellite's adjacent neighbours frequently changing. Other terrestrial wireless networks may also exhibit similar characteristics.

Low Earth Orbit (LEO) satellite networks are proposed to provide coverage over a wide area with low latency. Compared to traditional satellite networks where satellites are positioned at higher altitudes, LEO satellite networks require more satellites to provide global coverage, mainly due to the smaller coverage provided by satellites positioned at low altitudes. For some LEO satellite networks, satellites are required to be uniformly distributed around the globe. This requires that multiple orbits be used, with multiple satellites placed in each orbit. The actual number is not germane to this discussion, as it will also vary with other requirements, such as the number of satellites that must be visible at any given time by a single user.

When a group of satellites is arranged in predefined orbits, the pattern of the orbits is referred to as a constellation. Once common constellation is known as a polar constellation where each orbit of satellites crosses the Earth's poles. Satellites are launched into separate orbital planes with all satellites in the orbit travelling in the same direction. Due to Earth's rotation, satellites that may be launched in a northward direction would later pass over the same point in a southward direction. At any point in time half the satellites will be travelling in one direction and half will be travelling in the other direction. At most places in the constellation, adjacent satellites in adjacent orbits will be travelling in the same direction. However, there are regions where satellites travelling in adjacent orbits will be travelling in opposite directions. These regions are given the term "orbital seam" or simply "seam." The orbital seam is of key concern when inter-satellite communication links are employed, due to the relative velocity of satellites in adjacent orbits on opposite sides of the seam. These communication links are only active for a short period of time as the satellites pass each other in travelling opposite directions and there the link may only be active for a short period of time.

Another type of satellite constellation is known as a Walker-Delta constellation. A Walker-Delta constellation is based on multiple, inclined orbits where the angle of inclination of a satellite is defined as the angle between the ground track of the satellite and the equator as the satellite passes from the southern-hemisphere to the northern hemisphere. When the angle of inclination is less than 90 degrees, polar region is not crossed. All satellites travel in the same direction and each satellite can form adjacencies over four links that are relatively stable until they cross at the extreme ends of the orbit where they change direction from a northward to a southward direction. In a Walker-Delta constellation, seam-like behaviour can exist as a satellite on a non-adjacent orbit begins to cross back over another orbit. In some cases, an extra fifth link may be needed to track and communicate between satellites in different orbits. The use of a fifth link is that a more complete mesh can be formed. Similar to the seam in a polar constellation, the rapid motion of the satellites relative to one another places constraints on topology flooding mechanisms that may be used at the IP layer.

The issue of the seam may be dealt with by avoiding routing traffic across the seam. Although the shortest path between a source and destination satellite may be across a seam, it is possible to route traffic to avoid unstable, sporadically active links at the seam crossing. However, this often leads to longer routes with a large number of satellite links which may lead to high latencies.

A network topology is the collection of network nodes (or simply "nodes") with links connecting the network nodes. In a satellite network, nodes are not stationary and have a position and velocity (absolute or relative). Links between nodes may be sporadic and will have a status and criteria. Examples of a link status are active, inactive, failed, etc. Examples of link communications criteria are bi-directional, uni-directional, transmission speed, error rate, intra-orbit (within the same orbit), inter-orbit (between orbits), inter-satellite link (ISL), ground to satellite link, etc. The communications criteria may also be evaluated by referring to a schedule or table, which may be either predetermined or dynamically determined based on the predictable motion of satellites in orbit. Satellites within the same orbit will have a fixed position with respect to each other. At most times, satellites adjacent to each other in adjacent orbits will have a relative position that changes slowly and predictably. Across the orbital seam the network may have a dynamically changing topology, however the topology will be changing in a predictable manner based on the position and velocity of each satellite.

Therefore, there is a need for a method and apparatus for communicating across portions of networks with dynamically changing topologies, such as at a seam, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments of the present invention introduce a seam routing (SR) protocol layer into network nodes that allow for the routing of data across a network seam in a manner that is transparent to higher layer, end-to-end routing protocols. This provides additional flexibility in routing data across seams, prolongs the length of time a link across the seam is active, and reduces latency in cross seam data transmissions.

An object of embodiments of the present invention is to provide a method and apparatus for routing communications in communication networks that include portions with dynamically changing topologies.

In accordance with embodiments of the present invention, there is provided a method for routing data in a network. The method includes receiving, by a first network node, data to be routed using a first layer protocol to a second network node, the first network node is intermittently connected to the second network node over a link spanning a portion of the network. The first network node determines that the link fails to meet a communications criteria and encapsulates the data using a second layer protocol to produce encapsulated data. The second layer protocol is transparent to the first layer protocol and the encapsulated data includes connectivity instructions to route the encapsulated data to the second network node via a third network node. The second network node and the third network node are in communication across the portion of the network. The first network node transmits the encapsulated data to the third network node.

In embodiments, the communication criteria includes a link failure.

In embodiments, the network includes a satellite network, the first network node, the second network node, and the third network node include satellites, and the portion of the network comprises a seam in a topology of the network.

In embodiments, determining that the link fails to meet a communications criteria comprises querying a controller for a status of the link.

In embodiments, determining that the link fails to meet a communications criteria comprises querying a schedule for a status of the link where the schedule is based on a relative position or a relative velocity of the first network node and the second network node.

In embodiments, the first layer protocol comprises an IP layer, and the second layer protocol is located below the IP layer and above a MAC layer.

In embodiments, the second layer protocol uses MAC addresses to route the encapsulated data.

In embodiments, the second layer protocol implements a tunnel between the first network node and the second network node.

In embodiments, the first network node and the third network node are arranged within a same orbit.

In embodiments, the third network node is configured to communicate only with one or more network nodes arranged within the same orbit and with one or more network nodes arranged across the portion of the network.

In embodiments, the second network node and the third network node are in communication through a fourth network node and the second network node and the fourth network node are in communication across the portion of the network. The fourth network node further encapsulates the encapsulated data prior to transmitting the further encapsulated, encapsulated data to the second network node.

In embodiments, the first network node, the second network node, and the third network node include controllers in communication using the second layer protocol.

In embodiments, connectivity instructions include a seam routing header including an address of the first network node and an address of the second network node.

In embodiments, the seam routing header further includes a seam routing type, including one of a configuration of a satellite constellation, an indication that the data includes a control message, or an indication that the data includes an encapsulated packet.

In embodiments, the address of the first network node or the address of the second network node include one of an IP address, a seam routing layer address, or a MAC address.

In embodiments, connectivity instructions include second layer protocol routing information of the data from the first network node to the second network node.

In embodiments, the routing information is source routing information.

In embodiments, connectivity instructions include second layer protocol routing information of the data from one of the first network node to the third network node, or from the third network node to the second network node.

In embodiments, connectivity instructions include a number of hops between the first network node and the second network node and an address of network nodes between the first network node and the second network node.

In embodiments, connectivity instructions include flags indicating one of a direction of travel of the first network node, a direction of travel of the second network node, and an indication of a number of network nodes to be traversed before arriving at the link spanning a portion of the network.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention relate to routing data in communication networks that include one or more portions with dynamically changing topologies. In some networks the location and size of the portions may be unpredictable, such as in an ad-hoc network. In other networks the portion with the dynamically changing topologies may be located in known or predictable locations, or the topology may change in a predictable or periodic manner. One example is a seam in low Earth orbit (LEO) satellite networks arranged in a polar constellation. Another example is a satellite network using a Walker-Delta constellation. The embodiments described herein may be used with a wide variety of other network technologies and topologies, for example terrestrial mesh networks with relatively mobile stations, or cellular user equipment (UE) in an urban environment. However, within this specification the example of a LEO satellite network will be used for illustrative purposes.

Figure 1A:
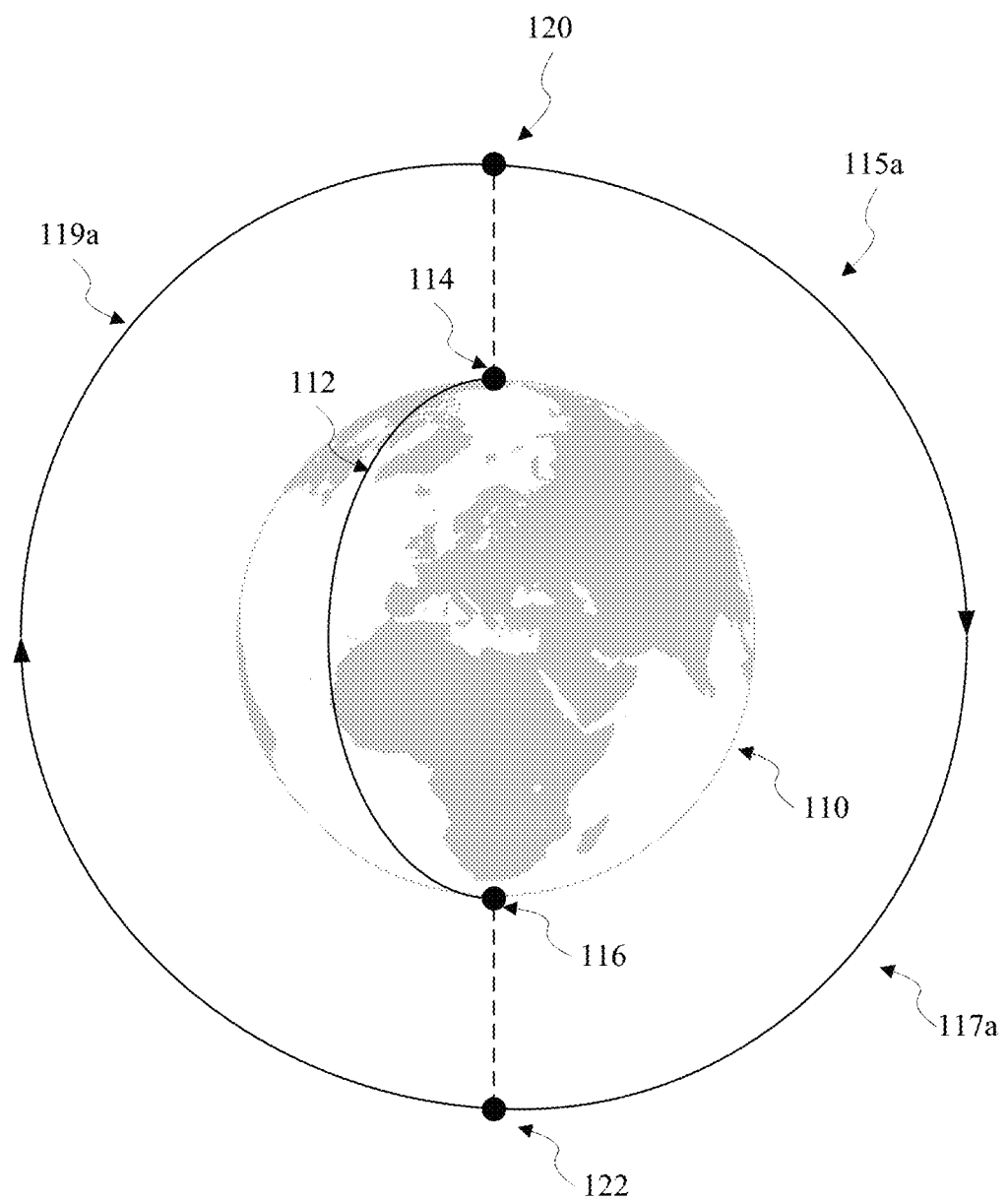
FIG. 1A illustrates Earth with a generic polar satellite orbit viewed from the equator according to an embodiment.

FIG. 1A illustrates a satellite polar orbit 115a as might be used by a LEO satellite network. The orbit 115a is arranged parallel to Earth meridians 112 so that it passes over the poles 114 and 116. Multiple satellites may follow this orbit, distributed along the orbit 115a. The orbit passes through two opposing points 120, 122 and is said to include, for purposes of the present discussion, a descending part 117a where the satellite(s) in the orbit passes from point 120 to 122, and an ascending part 119a where the satellite(s) in the orbit passes from point 122 to 120.

Figure 1B:
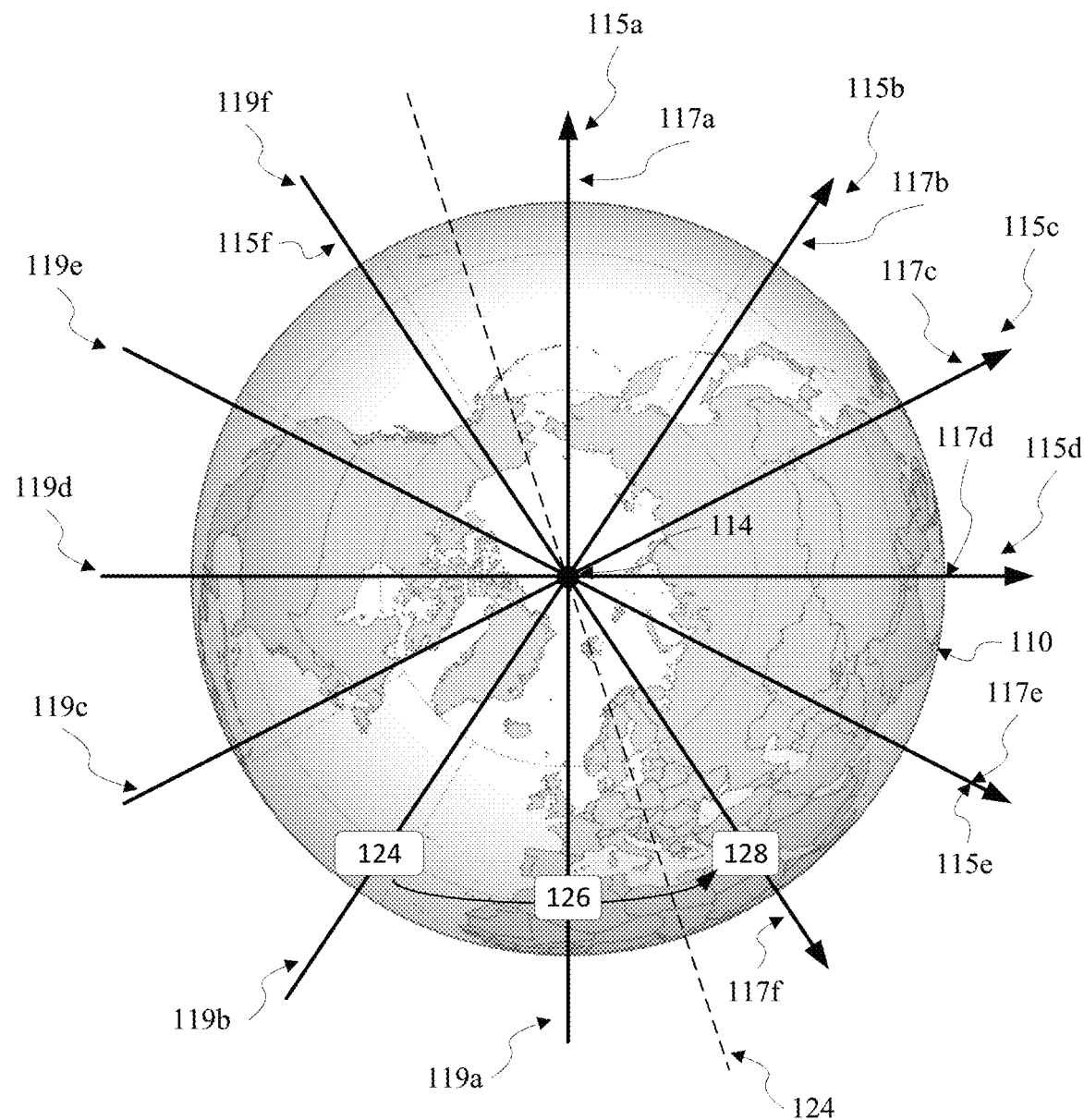
FIG. 1B illustrates Earth with a plurality of polar satellite orbits viewed from the North Pole with data communications across an orbital seam according to an embodiment.

FIG. 1B illustrates Earth 110, as seem from the North Pole 114, with multiple orbits 115a through 115f parallel to different meridians. Though FIG. 1B shows the view from the North Pole 114, the view from the South Pole 116 will look substantially the same. Although six orbits are shown for simplicity, additional parallel orbits may also be provided. Each orbit will pass through points 120 and 122 as illustrated in FIG. 1A. Each orbit also has a descending part 117a through 117f and an ascending part 119a through 119f There may be multiple satellites distributed approximately uniformly in each orbit, travelling in the same direction with ideally the same velocity so that two adjacent satellites in the same orbit will be stationary with respect to each other. However, even though the satellites in each orbit travel in the same direction as the satellites travelling in at least one other neighboring orbit, there are instances where the satellites in one orbit travel in the opposite direction to the satellites travelling in a neighboring orbit. For example, the descending part 117a of orbit 115a is adjacent to the ascending part 119f of orbit 115f, and the descending part 117f of orbit 115f is adjacent to the ascending part 119a of orbit 115a. Therefore, communicating between satellites in orbit 115a to satellites in orbit 115f is challenging due to the relative motion between such satellites as they pass in close proximity to each other for only a short period of time, travelling in opposite directions. This configuration is referred to as a 'seam' 124 and is located between the orbits 115a and 115f, and communication across the seam 124 may be technically challenging due to the dynamically changing network topology between these two orbits. Communication links across a seam are sporadic and transitory, and when such links are made or broken, network nodes need to be updated for routing purposes.

In FIG. 1B, to send data from satellite 124 to satellite 128 the shortest route is through satellite 126, across the seam 124 to satellite 128. As the link between satellite 126 and satellite 128 is across the seam, communications across this link can only occur for brief periods during each orbit when these two satellites pass in proximity to each other with velocities in opposite directions.

Figure 1C:
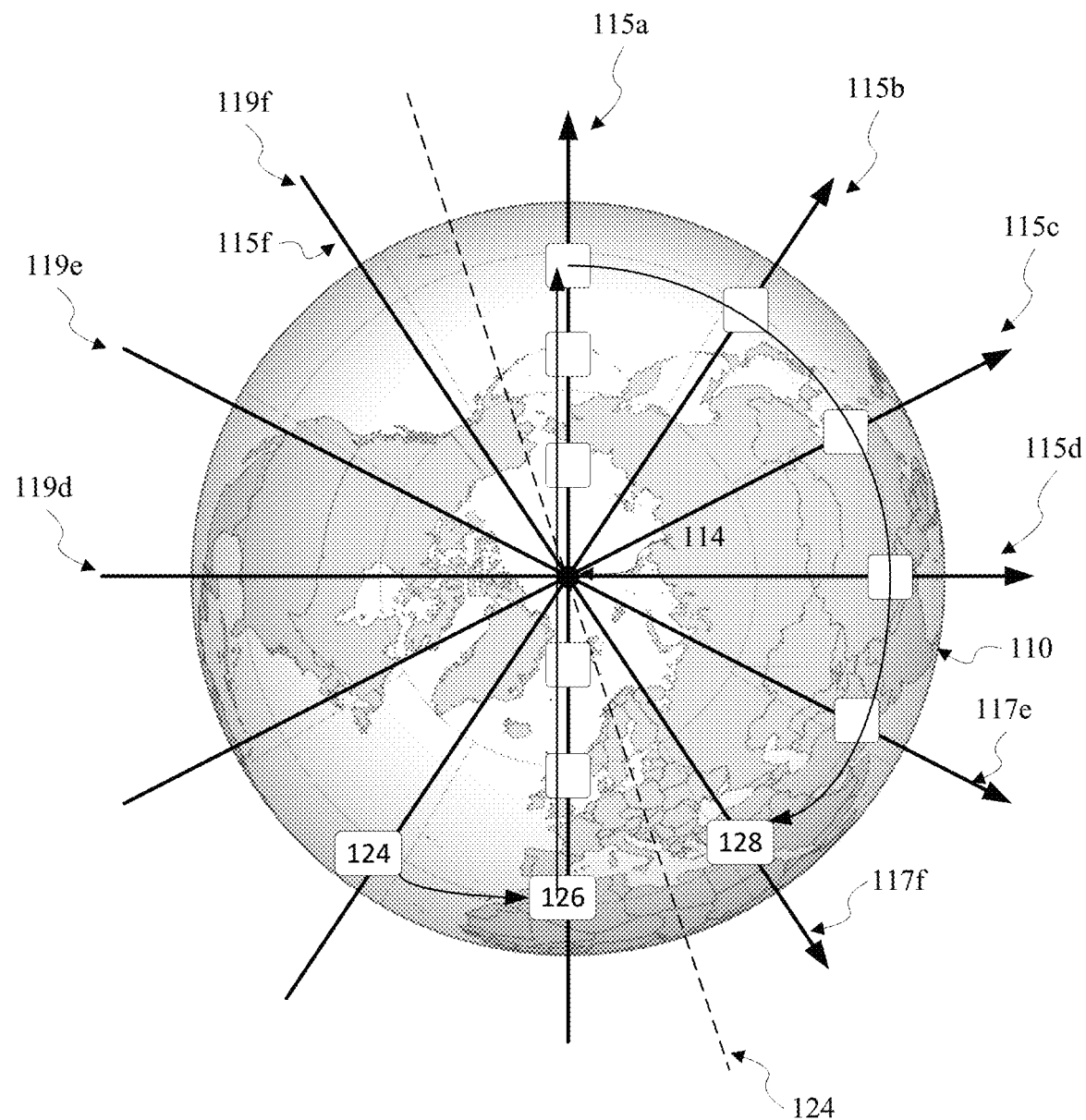
FIG. 1C illustrates Earth with a plurality of polar satellite orbits viewed from the North Pole with data communications avoiding an orbital seam according to an embodiment.

FIG. 1C illustrates an alternative routing of data, such as a packet, from satellite 124 to satellite 128 which involves forwarding the data, intra-orbit, along orbit 115a and then inter-orbit through orbits 115a, 115b, . . . , 115f in order to avoid the seam between orbits 115a and 115f. In this example, the inter satellite links are stable as they do not cross the seam, but 11 hops are required for the data to reach its destination which adds to latency.

In both examples of FIG. 1B and FIG. 1C, performance requirements, particular maximum latency requirements, of the network or of communications channels over the network may not be met using the routes illustrated.

In some embodiments, satellites may be arranged in other topologies such as a Walker-Delta topology where a plurality of orbits are arranged so that they are inclined with respect to the equator. The use of a Walker-Delta topology results in seam-like areas where orbits cross at the extreme ends of the orbit as they change direction from a northward to a southward direction. Other network topologies may include seams or similar portions with topologies that exhibit seam like behaviour that vary dynamically and can make use of embodiments described herein.

For given topology of satellites and satellite orbits, and for combinations and location of ground stations, a satellite will have closest neighbors to communicate with. In cases where satellites are in the same orbital plane, intra-orbit links between adjacent satellites in the same orbital plane will be static at most times. The relationship between these adjacent satellites may change in the case of the failure of a satellite or when a new satellite is added to the same orbital plane, however these are rare occurrences.

Given a satellite constellation and topology, the time, frequency, position, and distance between any two satellites will be known, can be determined, looked up, or calculated, and this information can be used to predict the topology of the constellation at any time. This information may be used to do routing based on a schedule that takes into account the relative position and velocity of satellites. This information may also be used to determine an optimal routing algorithm for intra-orbit and inter-orbit communications, including communications across an orbital seam.

In most applications, if data can be routed directly across the seam, performance can be improved both in terms of the user perceived impact (delay) plus the improved overall stability of the network. With reference to the well-known ISO Open Systems Interconnection (OSI) model of network protocol layers, embodiments add a seam routing (SR) layer that provides an abstraction of connectivity across the network seam that will be transparent to a routing layer at layers above the SR layer. In the case of changing network topology at a seam of the network, the SR layer can provide connectivity over multiple links while higher layer routing layers see a link as it was previous to the topology changing. This reduces the number of routing table updates that may be required by a higher routing layer. In some embodiments, the higher routing layer is the Internet Protocol (IP) layer, while layers below the SR layer may include Ethernet, SDN, OTN, or other physical layer that may be utilized in a satellite based network. However, different network technologies will use different routing layers.

Figure 2:
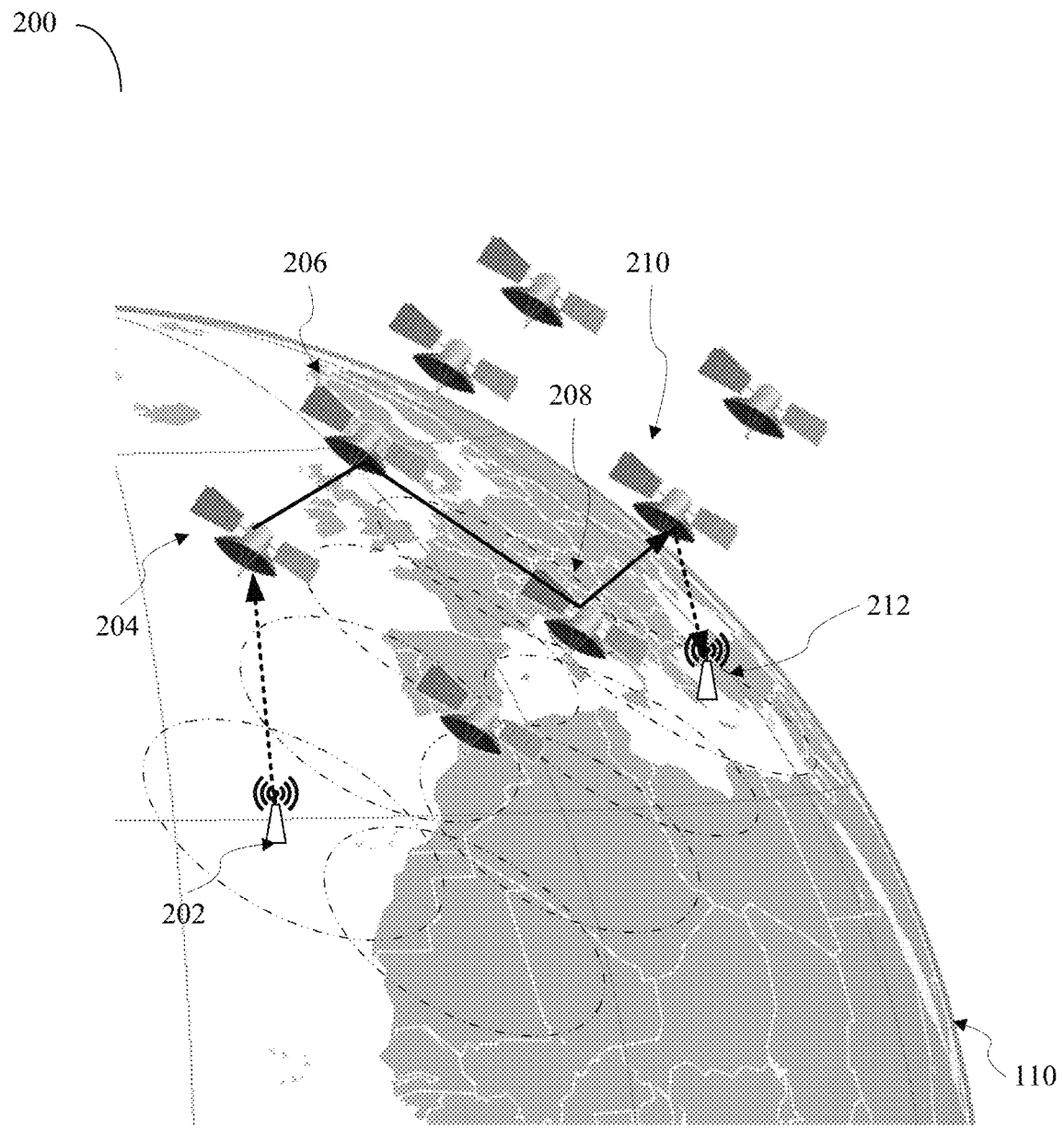
FIG. 2 illustrates data communications between two ground stations over satellite links according to an embodiment.

FIG. 2 illustrates data communications within an illustrative satellite network 200 providing overlapping coverage of Earth 110 below each satellite. End-to-end communications originates at a ground station 202, is transmitted to a satellite 204 over a ground-to-satellite link, is forwarded on one or more inter-satellite links (ISL) to other satellites 206, 208, 210, and is finally transmitted to another ground station 212 on a satellite-to-ground link. Ground stations may be individual users, gateways serving multiple users, terrestrial network nodes, etc. Ground stations may provide access to any number of terrestrial networks.

User traffic from ground stations is predominately IP traffic which requires that satellites include IP layer routing capabilities or be capable of routing IP packets. Routing among satellites may be done using similar network routing protocols or routing protocols adapted from IP routing protocols. Network routing protocols in modern communications networks utilize link-state protocols to track the status of links between network nodes and to maintain routing information that determine how to route IP packets between nodes in the network. Popular link-state protocols used in IP packet networks include Open Shortest Path First (OSPF) protocol and Intermediate System to Intermediate System (IS-IS) protocol. These protocols though developed for packet-based data networks may be used with some modifications in satellite based data networks.

Figure 3:
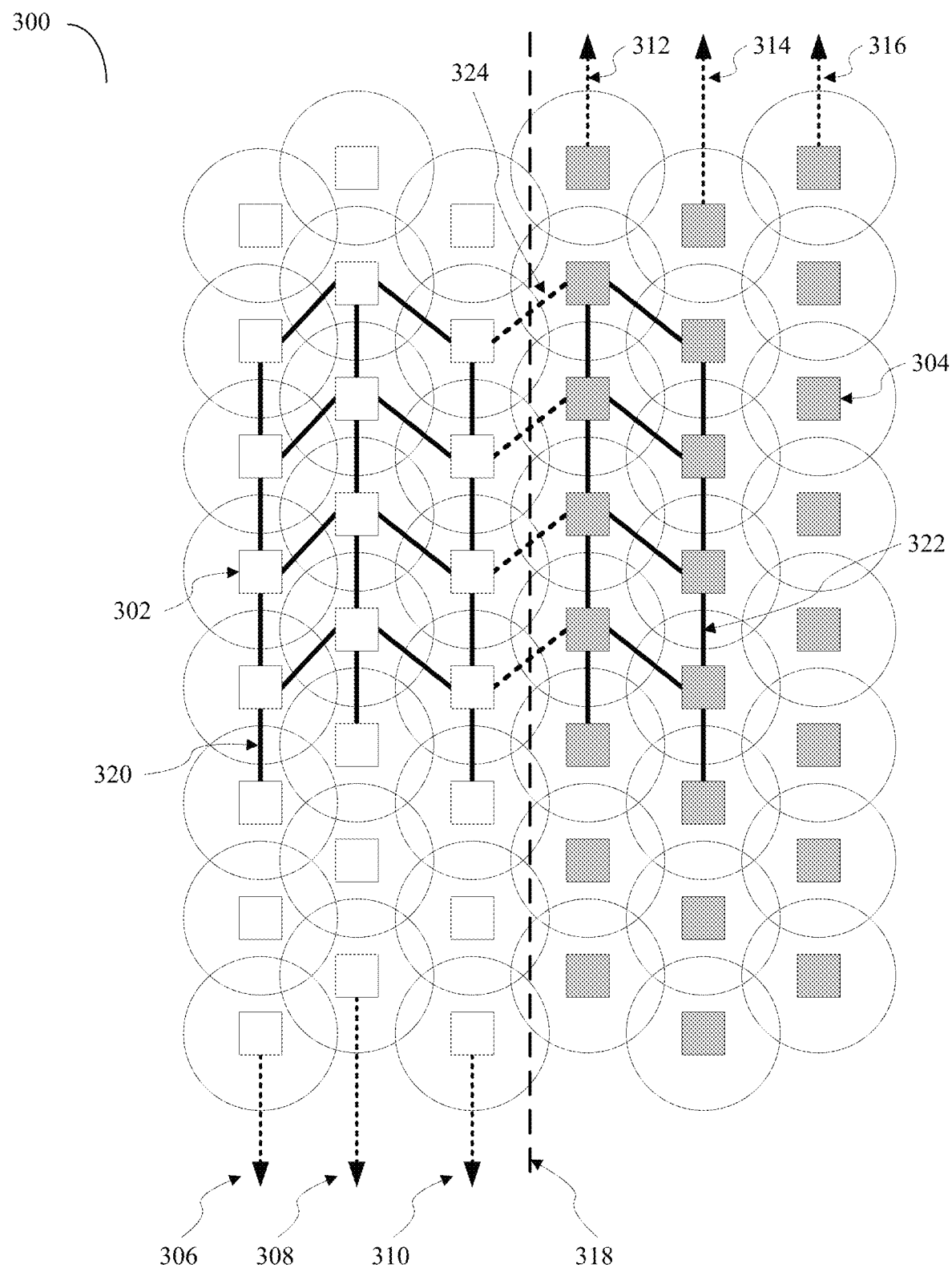
FIG. 3 illustrates a portion of a low Earth orbit (LEO) satellite constellation in the region of a seam according to an embodiment.

FIG. 3 illustrates a satellite network topology 300 as might be found in a LEO satellite network. LEO satellites such as satellite 302 and 304 are arranged in multiple parallel polar orbits 306, 308, 310, 312, 314, and 316, forming a tight mesh in order to provide full coverage of the ground below. Satellites in orbits 306, 308, 310, on one side of a seam 318, will be moving together in the same southerly vertical direction. Satellites in orbits 312, 314, 316, on the other side of the orbital seam 318, will be moving together in the opposite northerly vertical direction. Links such as link 320 between satellites in the leftmost three orbits 306, 308, 310 have stable links between themselves. Links such as link 322 between satellites in the rightmost three orbits 312, 314, 316 have stable links between themselves. However, links such as link 324 between satellites on opposite sides of the seam will be dynamic and only active when satellites in orbit 310 are in proximity to satellites in orbit 312.

In a link-state protocol, individual network nodes with router functionality, such as a satellite, create and maintain routing databases by calculating network routes based on link adjacencies that exist between other router nodes in that network. A key requirement is a function to allow the exchange of adjacency information to occur, both at initial network or router setup and also in the case a change in the network topology, which occurs regularly at network seams or at portions of the network with dynamically changing topology. Typically, this is performed by link-state protocols by exchanging messages called link state advertisement messages (or LSAs). When received, routers can derive the network topology and compute the paths needed to reach a specific address or a set of addresses. If all routers have the same link state information and use the same topology algorithms, each router will produce accurate route calculations, and be able to accurately determine the network topology.

When the topology of the network changes it is detected using messages that are periodically sent by the link-state protocols. In the event that a message is not detected within a certain measurement tolerance window, the link state protocols will determine that a link failure has occurred. When a topology change is detected at a router, the router will begin to notify all nodes directly connected to it via LSAs and will then update its routing database to reflect the loss of the link. Each node receiving the updated link information with also re-compute their routing information database and then notify all nodes that are directly attached to it. This process will continue at subsequent nodes until all nodes have been reached. The process is often referred to as flooding, as a large number of LSA messages may flow away from the location of the change in order to communicate network topology changes.

Until each router has received the updated link state information and updated its routing information, the network will operate in a degraded mode, since the topology in some routers may not match the actual network topology. In this case, packet loss may occur. The duration of this degraded mode will last until all routers have the same topology information and is referred to as the convergence time. As can be expected, the convergence time will vary with the size of the network. A particularly challenging case is that where the network is large and experiences very frequent outages. If the time between outages is less than the convergence time, then the network may never fully converge. Large low earth orbit satellite networks are considered large by wireline standards and will experience significant periods in a degraded mode during flooding events.

Figure 4:
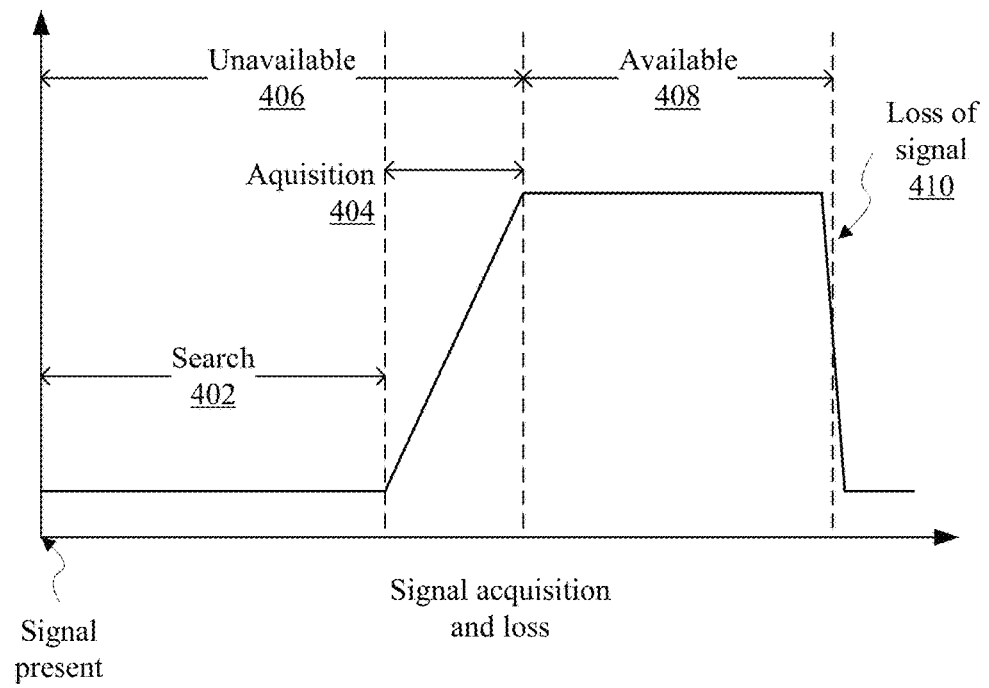
FIG. 4 illustrates an example of network links that are sporadically available according to an embodiment.
Figure 5:
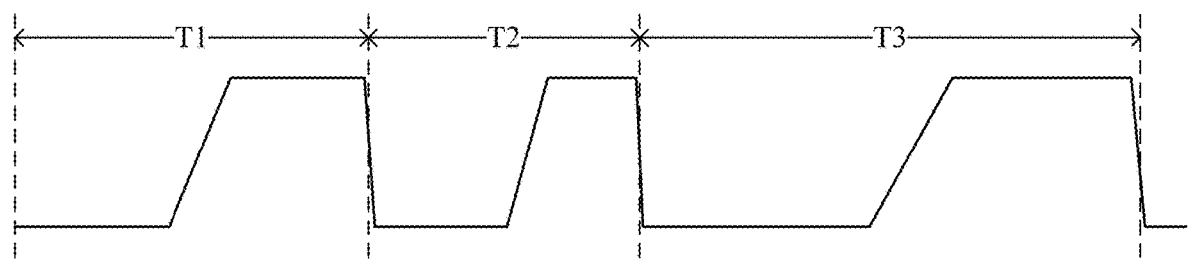
FIG. 5 illustrates an example of network links that are periodically available according to an embodiment.

The behavior of links across orbital seams is such that they are periodically established and then broken as satellites travelling in opposite directions on either side of the seams come in proximity to each other then move away from each other. FIG. 4 illustrates an example of network links that are sporadically or intermittently available. As an example, the case of inter-satellite links (ISL) will be used. ISLs are free-space optical links for which search 402 and acquisition 404 periods are required before the ISL becomes available 408. When two satellites are sufficiently far away from each other they are unable to communicate with each other and the ISL is unavailable 406. The satellites will be in a search phase 402 looking for the other satellite. As they get sufficiently close, one or both with will detect the other and begin the signal acquisition process 404. During the search 402 and acquisition 404 process the ISL will be unavailable 406. Once acquisition 404 is complete, the ISL will be available 408 for communication until the two satellites pass each other and draw sufficiently far from each that the ISL signal is lost 410. As illustrated in FIG. 5, the period, T, for each orbit may vary yielding a T1, T2, T3, etc. that is different, where each of T1, T2, and T3 is the time of the search 402, acquisition 404, and available 408 periods as described in FIG. 4.

For satellite networks with fixed orbits search, acquisition, available, and signal loss events will occur substantially regularly based on the position, velocity, altitude, etc. of the satellites as well as the location of the orbits. In these cases, satellites may be able to anticipate when a link will be broken or re-established and use this information to optimize the routing protocols used. For other types of networks, these events may be irregular or unpredictable.

Each time a link across a seam is broken it is detected by the link-state protocols at the routing level, such as the IP level. This topology change initiates a flooding event with LSA messages being transmitted to all nodes in the network to update routing information. These flooding events require time to complete and consume network resources. Embodiments implement reconfiguration of a routing link using protocols at a SR layer lower than end-to-end routing protocol layers. The reconfiguration is transparent to the routing layer and can delay the need for flooding updates thereby reducing the frequency of flooding events and reduce the number of link state updates in the end-to-end routing layer.

Figure 6A:
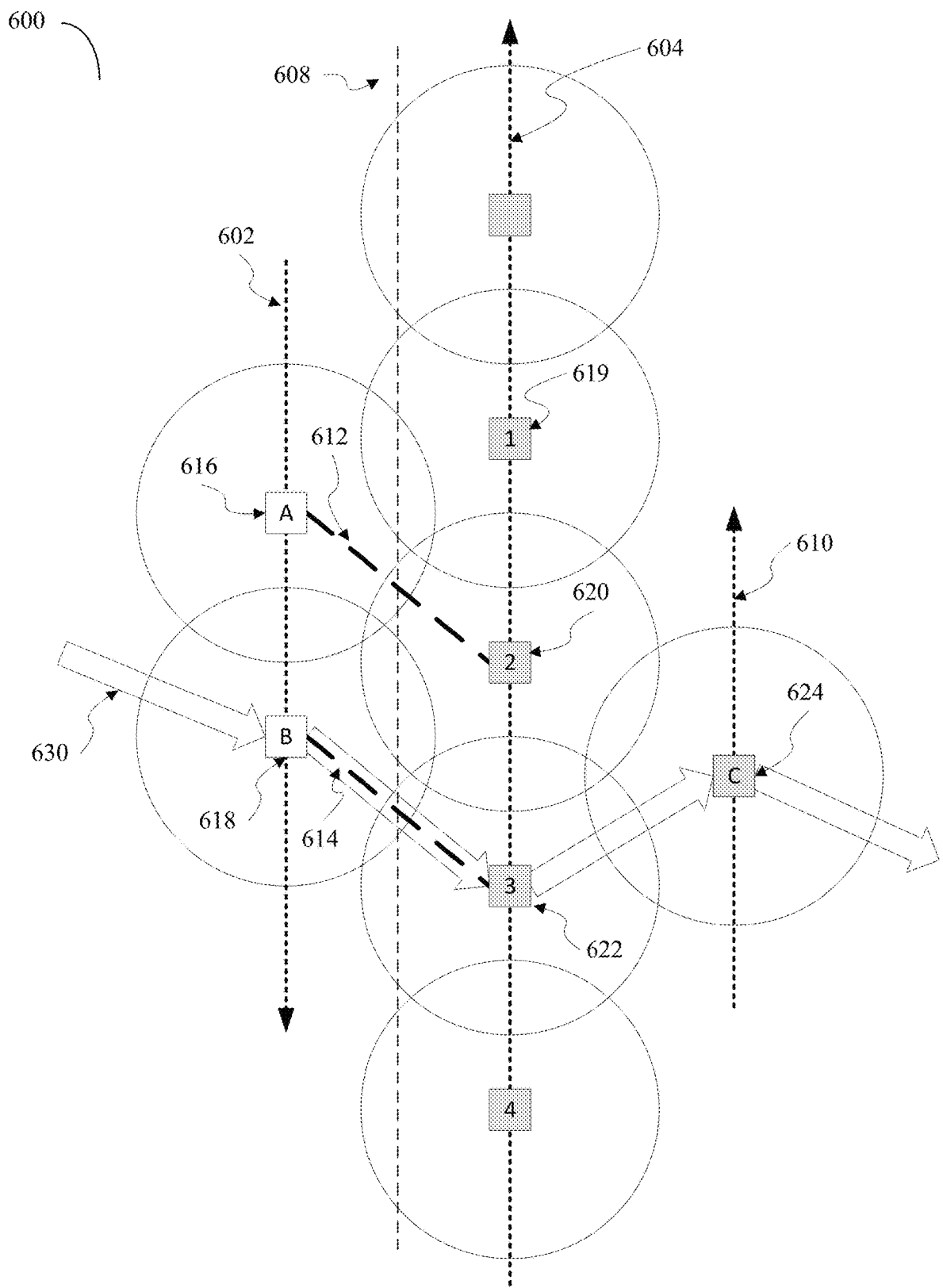
FIG. 6A, FIG. 6B, and FIG. 6C illustrate an example of communications across a seam in a LEO satellite constellation according to an embodiment.
Figure 6B:
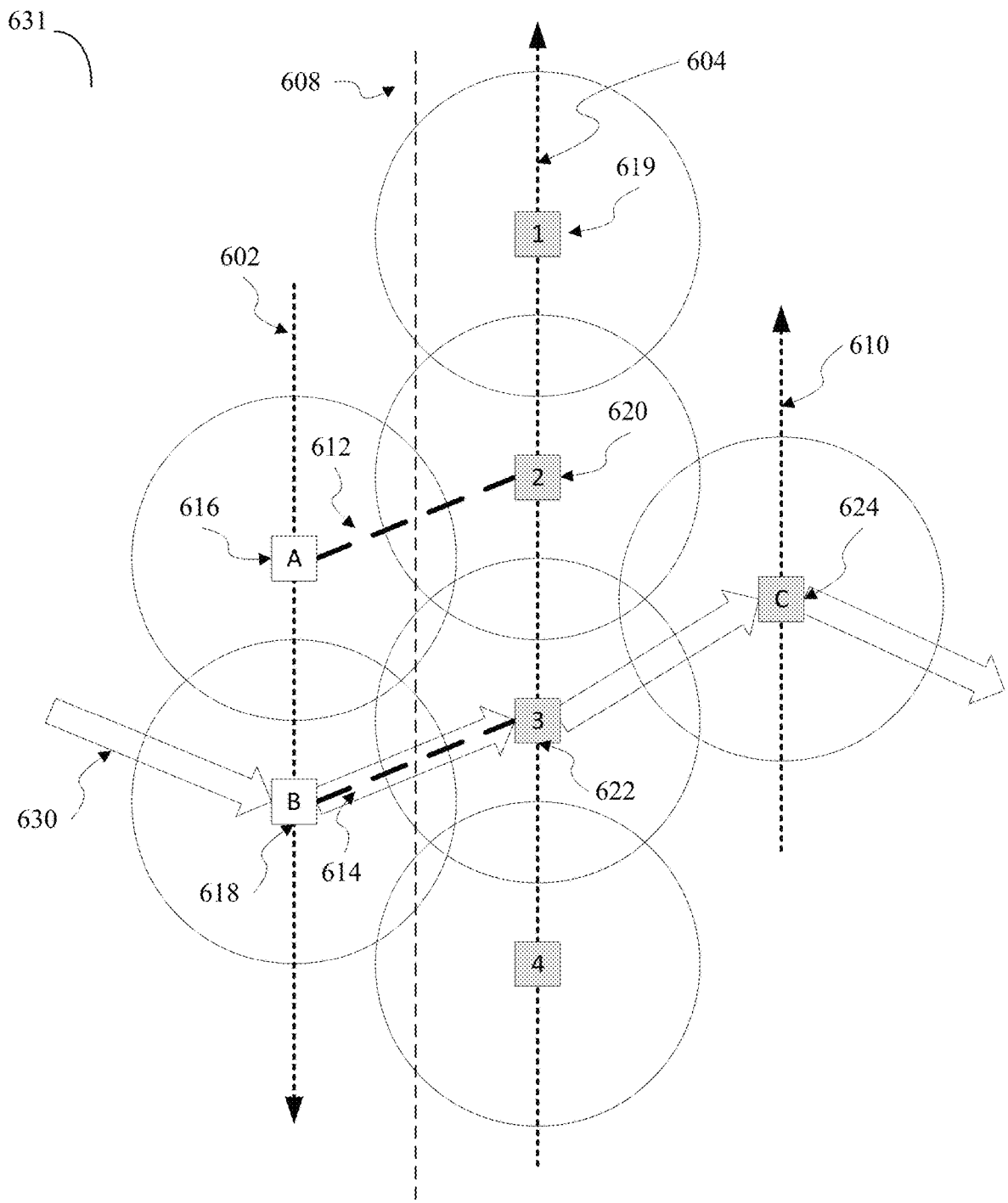
Figure 6C:
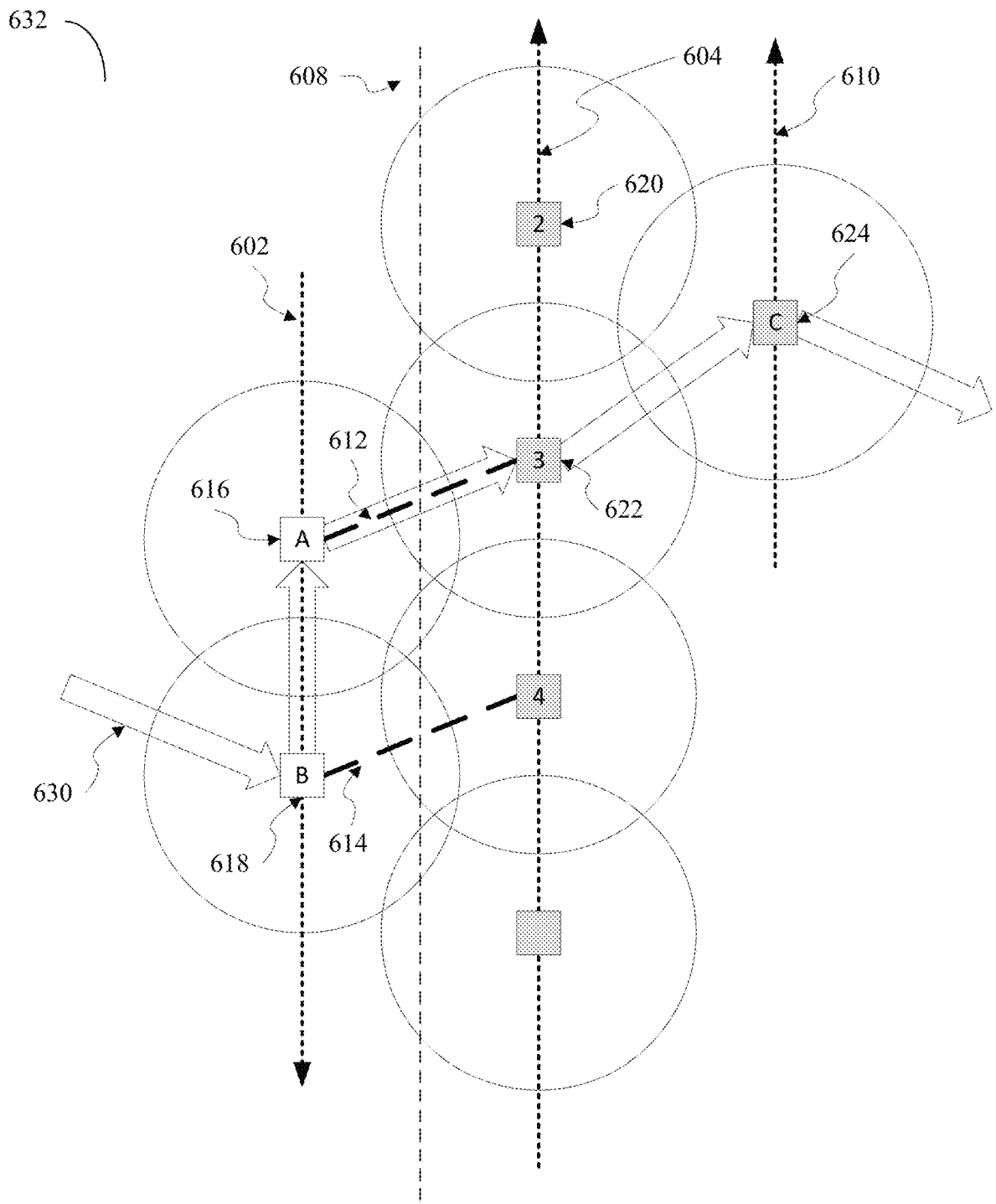

The relationship between a path 630 routed at the IP (routing) layer across the seam 608 and the motion of the underlying satellites can be seen with reference to FIG. 6A, FIG. 6B, and FIG. 6C. The FIGS. include 3 parallel polar orbits 602, 604, and 610. Satellite A 616 and satellite B 618 in orbit 602 are to the left of the seam 608 and are moving in a southerly direction. Satellite 619, satellite 620, and satellite 622 in orbit 604 are to the immediate right of the seam 608 and are moving in a northerly direction. Link 612 may connect satellite A 616 to satellite 2 620 across the seam 608. Link 614 may connect satellite B 618 to satellite 3 622 across the seam 608. Satellite 624 in orbit 610 is moving in a northerly direction. The path 630 is shown initially passing through satellite B 618, satellite 3 622, and satellite C 624. In FIG. 6A the path crosses the seam 608 directly from satellite B 618 to satellite 3 622 as they are sufficiently close to each other and moving closer together. In FIG. 6B, which occurs after FIG. 6A, the satellites in orbit 602 have moved south while the satellites in orbit 604 and in orbit 610 have moved north. Path 630 still passes through satellite B 618, satellite 3 622, and satellite C 624 but the path has a different shape than in FIG. 6A and is still available, though satellite B 618 is now moving further away from satellite 3 622. Link 612 between satellite A 616 and satellite 2 620 also exists and spans the seam 608 but is not used by the path 630. In FIG. 6C, satellite B 618 and satellite 3 622 are now far enough apart that the link 614 can no longer communicate data and the link between them is down. The path needs to pass over an alternate route such as through satellite A 616. While this may be handled by the IP layer detecting the loss of the link 614 and conducting a flooding event to update routing tables in the network nodes, this causes the network to undergo a period of instability and degraded performance until the network has converged. Embodiments provide an underlying SR layer that is lower in the protocol stack than the IP routing layer. The SR layer can modify the path 630 in a manner that is transparent to the higher routing layer, thereby preventing flooding. In the example of FIG. 6C, one node, satellite A 616 has been inserted into path 630 to preserve connectivity across the seam 608 between satellite B 618 and satellite 3 622. As satellite B 618 and satellite 3 622 move further apart, additional satellites such as satellite A 616 may be inserted in the path, increasing the amount of time path 630 may be used, thereby reducing the number of flooding events at the cost of increased end-to-end latency (as additional nodes are added to path 630). At a certain point, no more intermediate satellites will be inserted, the path 630 will be allowed to go down, and a flooding event will occur to update routing within the network.

In embodiments, network nodes adjacent to a portion having dynamically changing topology include router capabilities. In further embodiments, these network nodes also include a distributed controller for the purposes of managing connectivity across the network portion. In other embodiments, all network nodes may implement these features. For the example of a LEO satellite network, each satellite in the orbits adjacent to a seam implement a function to enable the satellite to include a distributed controller for the purposes of managing the connectivity across the seam. A control channel is formed between satellites adjacent to a seam. This allows controllers to exchange link information regarding connectivity between satellites in these orbits and across the seam. When a packet with routing that requires it to be forwarded over the seam is received by a node adjacent to the seam, the controller will determine connectivity options necessary to send the packet either directly across the seam or, if direct connectivity is absent, over a second alternate satellite, where the second satellite is a satellite that is in the same orbital plane. The controller will cause the addition of information to the routed packet to instruct the next receiving satellite that the packet should be routed over a specific path. This can be done using a dedicated channel that carries only control or operational data, or be in band processed, carried as dedicated overhead, or as messages interspersed with payload data. Source routing, where a sender of a packet partially or completely specifies the route the packet takes through the network, may also be used. The controller will also manage the dynamic nature of the addressing to achieve data transfer over a dynamically changing portion of a network. Though this description refers to two satellites, the process can be extended to apply to multiple satellites.

In protocol stacks used by networks, the relationship between different layer networks is achieved by adapting from one protocol layer to the next lower layer protocol and to the next upper layer. In certain cases, each layer may have its own address space and data formats associated with it. For example, in a typical enterprise network, computers are identified by their IP network address, but they may connect to an Ethernet based LAN. The IP packets may be encapsulated into Ethernet frames and these frames may be switched based on their MAC address. The address space is normally static. IP addresses specify an end-to-end source and destination and are normally applied before data transmission can occur and they do not change once transmission has started. A variation to this is used for mobile phones that utilize protocols to enable calls to be passed from one base-station to another. In this case, the IP address remains fixed, but the handset's IMEI number is used.

Figure 7:
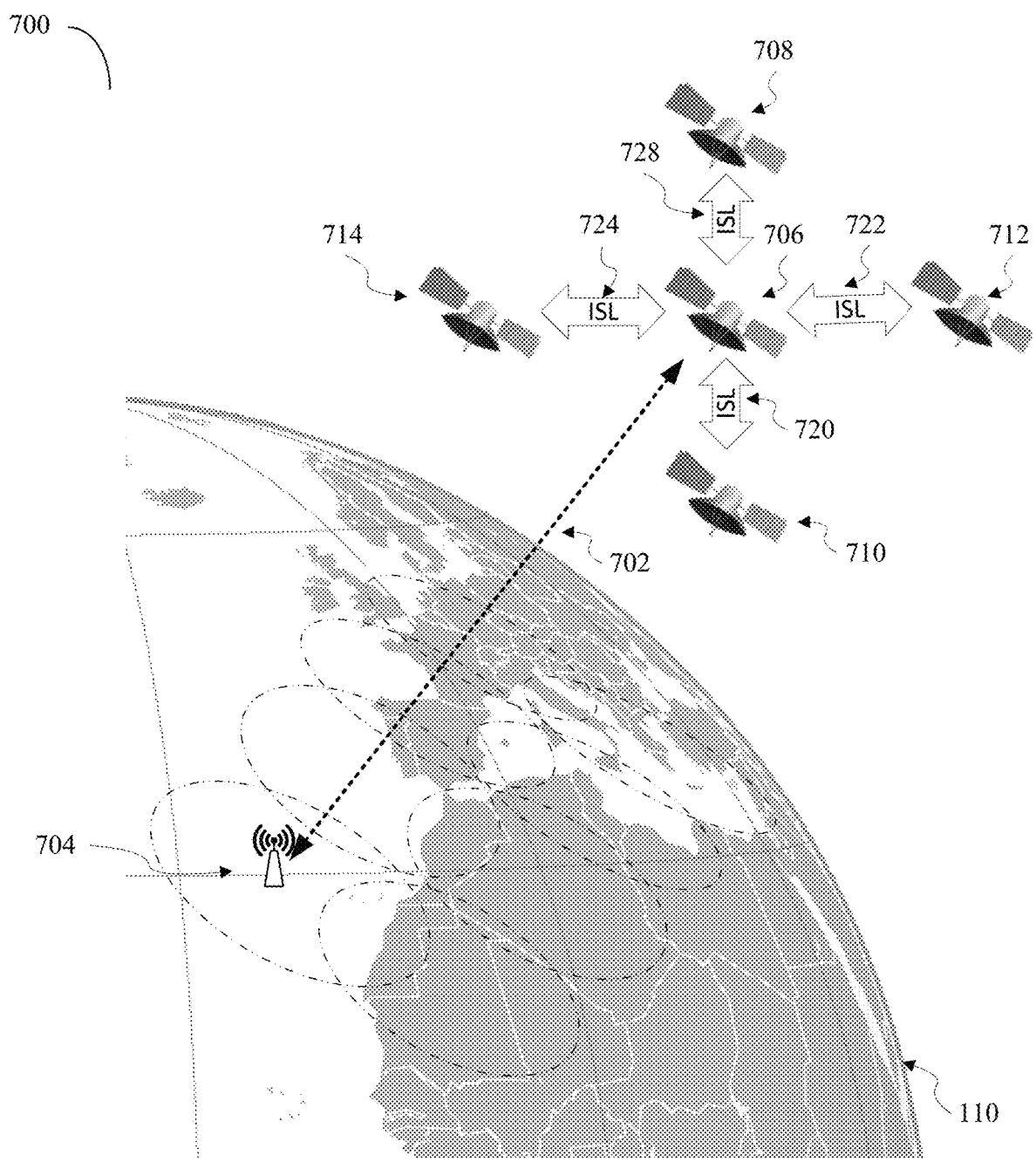
FIG. 7 illustrates a simple link adjacency model with a satellite-ground link and inter-satellite links according to an embodiment.

Embodiments will be further illustrated with reference to model 700 with various interfaces within a satellite network, such as a LEO satellite network. As illustrated in FIG. 7, a model for a satellite may have five available interfaces as seen using some Walker-Delta constellations or multi-shell constellations. Though not required in some embodiments, one interface 702 will be the interface to a terrestrial network through a ground station 704. The other interfaces can be classified into two categories and can be described relative to their position within a polar orbit, as illustrated in FIG. 1B and FIG. 1C. In other constellations additional links or interfaces may exist.

The first category of interface is referred to as an In-Plane Inter Satellite Link (IP-ISL). An IP-ISL is an intra-orbit link that connects two satellites that are in the same orbital plane. Since satellites are in the same orbit they travel in the same direction and at the same speed. As a result, the IP-ISL remains static. Referring to FIG. 7, links 720 and 728 between satellite 706 and satellites 708 and 710 are IP-ISLs.

The second category of interface links satellites that are in different orbital planes. With respect to the FIG. 7, satellites 714 and 712 to the left or right of satellite 706 are in different orbits connected by inter-orbit links 722 and 724. Adjacencies between satellites in different orbital planes may be dynamic in nature depending on their location with respect to seams. In embodiments, links that are on either side of a seam are of key concern.

Figure 8A:
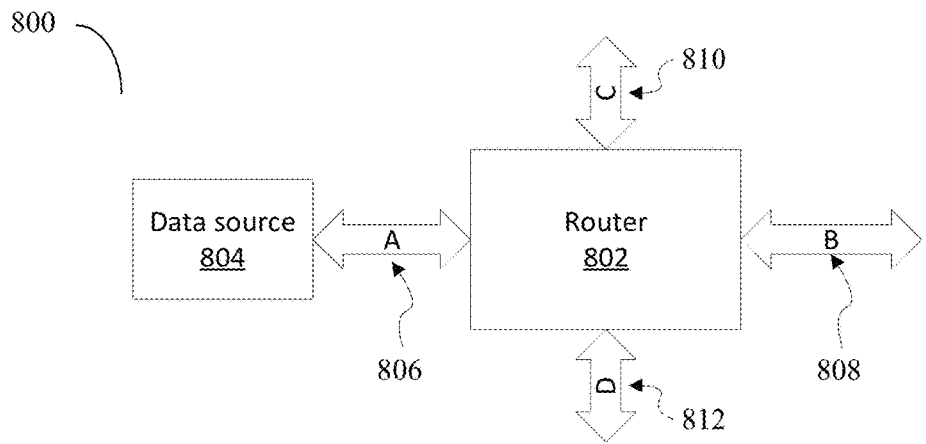
FIG. 8A illustrates an example network model of a router architecture according to an embodiment.
Figure 8B:
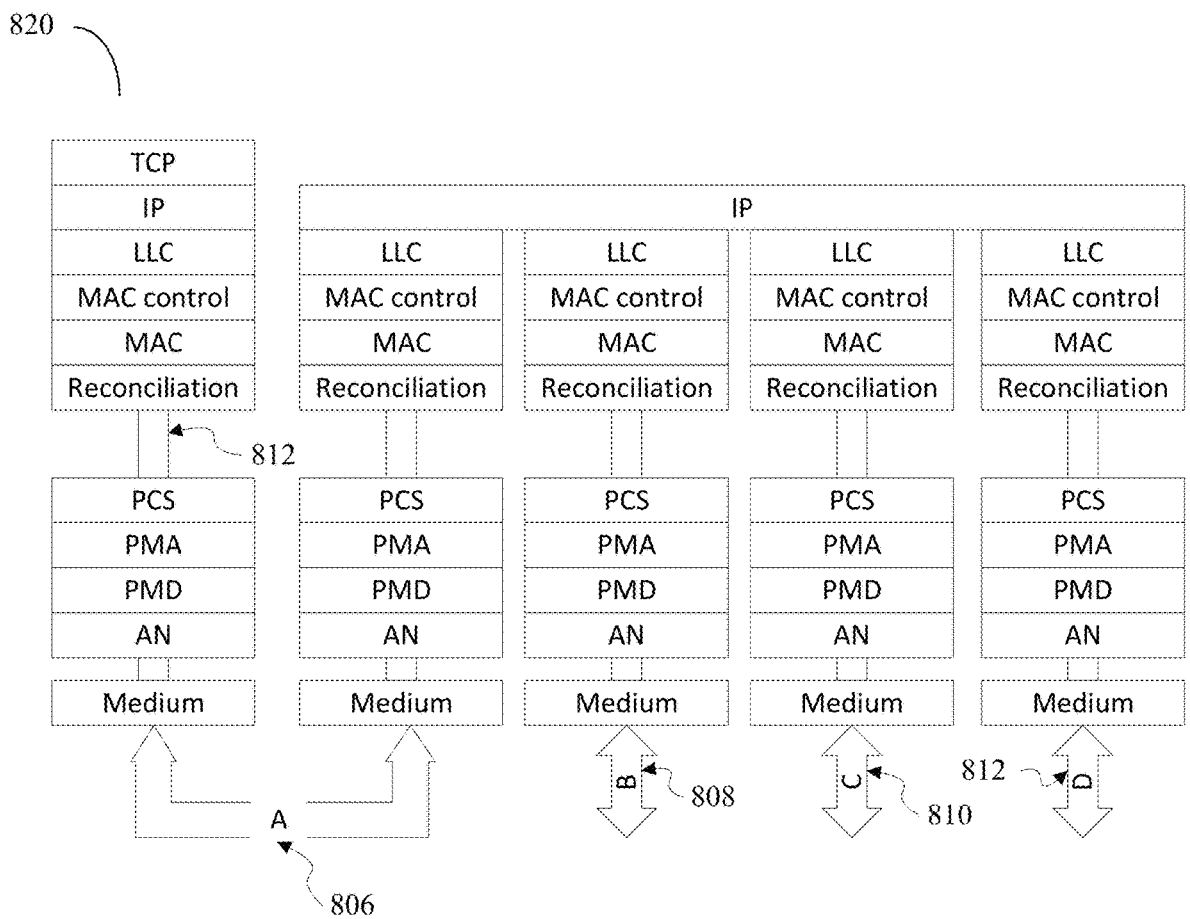
FIG. 8B illustrates a protocol reference model of the router of FIG. 8A according to an embodiment.

FIG. 8A illustrates a network model 800 of an exemplary network router 802 that may be used to illustrate the use of a protocol stack, for example an Ethernet protocol stack 820 as shown in FIG. 8B. The router 802 may be any network or computing device with routing functionality implemented in hardware, software, or a mix of hardware and software. A data source 804 is connected over link 806 to a network node with router functionality 802. The router 802 has three other interfaces to links 808, 810 and 812. Links may be any type of wired or wireless networking link dependent on the particular design and configuration of the router 802. In embodiments, the topology of the constellation or network may include more or fewer links between satellites, between satellites in different orbits or in space, or between satellites and the ground.

FIG. 8B illustrates a protocol stack for network model 800 in terms of the OSI reference model which is implemented in hardware and software for each link interface, 806, 808, 810, and 812, of the router 802. In general, data enters a link from the bottom of the stack, labelled "medium," which is the physical interface to external devices. Examples are an Ethernet wire, optical fiber, or wireless antenna. Received data then travels up the stack with each layer performing a task on the data, which may include adding headers, or other information, dividing or combining data, and encapsulating or de-encapsulating data. When data is transmitted over a link, the process is reversed, with data travelling down the protocol stack until it is transmitted over the link medium.

Of particular interest are the IP layer and the MAC layer. The IP layer has the task of delivering data packets from a source host to a destination node. The IP layer receives a packet from the lower MAC layer, encapsulates it, and adds an IP header. The MAC layer, used in the Ethernet protocol, has the task of controlling hardware that interacts with the wired, optical, wireless, satellite physical medium interfaces. The MAC layer uses MAC addresses to switch packets. In the model of FIG. 8A, the MAC layer switches data packets between links such as 806 and 810 without knowledge of the end destination of the packet. The IP layer uses routing information to know which link the packet should take in order to reach its end destination. The IP layer accesses link-state protocols used to monitor and update the routing tables. Switching at the MAC layer is transparent to the IP layer. The IP layer knows the end destination but does not know which link must be used to reach that destination.

Figure 9A:
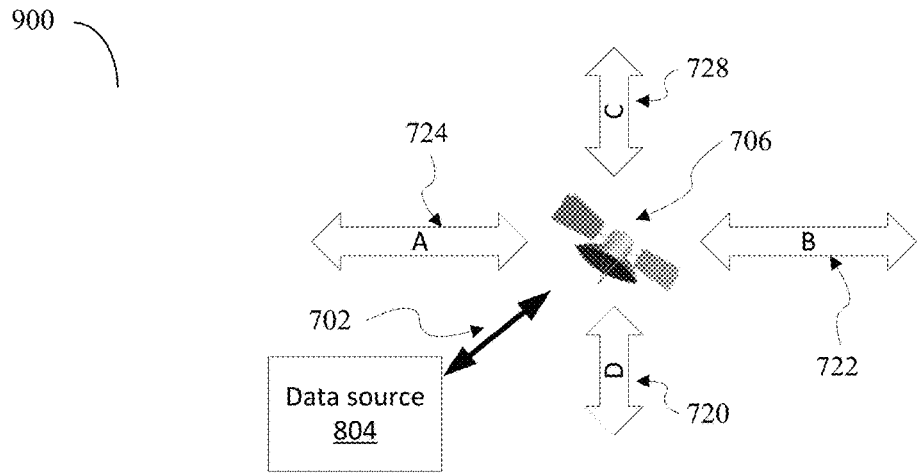
FIG. 9A illustrates an example network model of a satellite according to an embodiment.
Figure 9B:
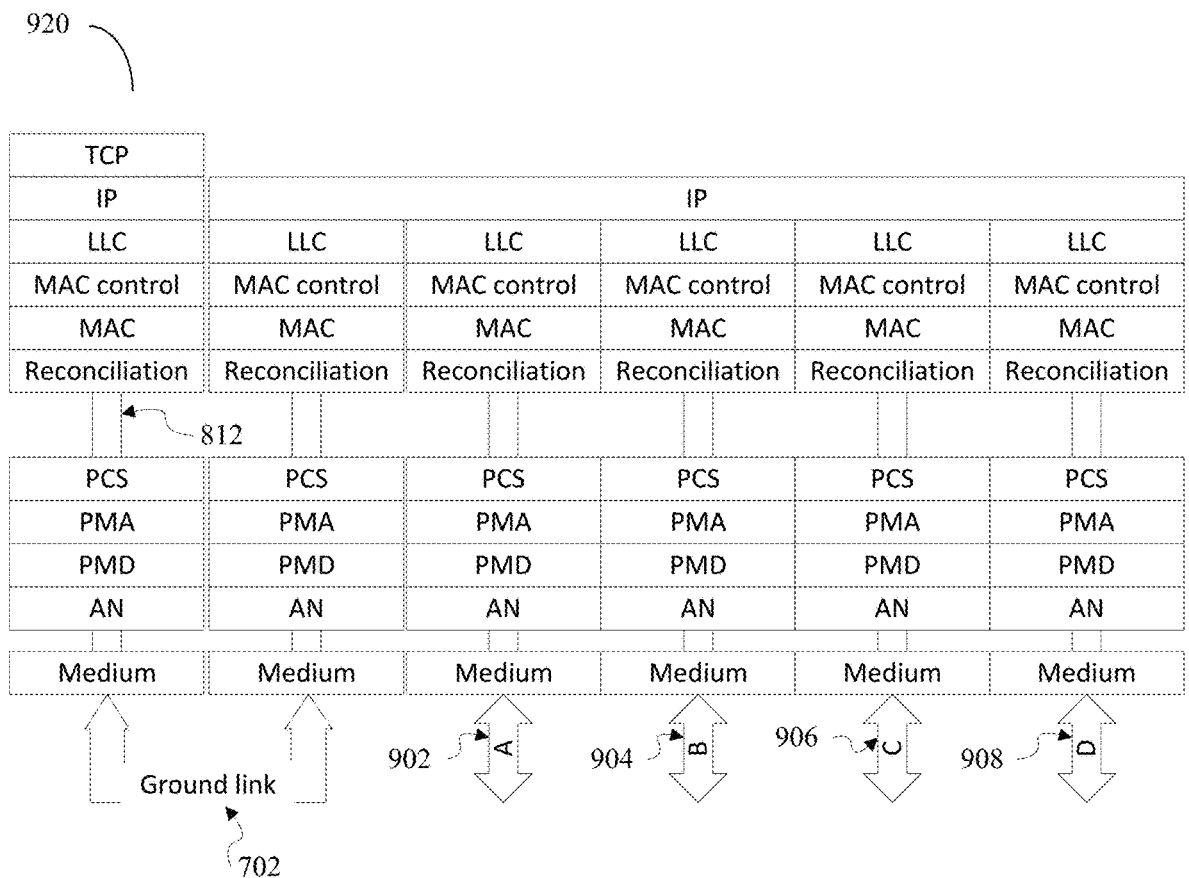
FIG. 9B illustrates a protocol reference model of the satellite of FIG. 9A according to an embodiment.

FIGS. 9A and 9B illustrate a variation of the models 800 of FIG. 8A and 820 of FIG. 8B adapted for use in a satellite network environment. FIG. 9A illustrates a network model 900 while FIG. 9B illustrates a corresponding protocol reference model 920 in terms of the OSI reference model.

The protocol layers are illustrated similarly to the layers used in a traditional IP router where routing is done at the IP layer as illustrated in FIG. 8B. Protocol sub-layers are expressed in terms of the sub-layers defined for Ethernet interfaces. Since the intent of these FIGS. is to illustrate the behavior unique to embodiments, the functionality will be described in terms of an existing routing system such as IP routing. In a satellite network, IP data is likely to be sent to, and received from ground stations, and satellite networks such as LEO satellite networks are expected to use variations of IP protocols for end to end routing.

With reference to FIG. 9A, satellite 706 is able to communicate over a ground-satellite link 702 to a data source 804. Satellite 706 has two IP-ISLs 720 and 728 to satellites in the same orbit that precede and follow it in orbit. Satellite 706 has two other inter-orbit ISLs 722 and 724 to communicate with adjacent satellites in orbits to the east and west (for the case of LEO polar orbits.) In many ways, this model is similar to the model of FIG. 8B with the addition of a fourth ISL interface.

Embodiments treat a portion of the network with dynamically changing topology, such as a seam, as a specific routing area. Packets that are to be routed over the seam are carried in a tunnel operating below the routing layer (IP layer), that has a routing area that may be restricted to nodes that are adjacent to the seam. In operation, an incoming packet is encapsulated together with necessary routing and control information to instruct how packets should be forwarded along the path or across the seam. In computer networks, a tunneling protocol is an alternate communications protocol that allows for the movement of data from one network node to another. It involves a process called encapsulation that involves repackaging the data into a different form. The tunneling protocol works by wrapping the packet in the format of a lower protocol layer in a manner that is transparent to higher level protocol layers.

Embodiments may be utilized for any routing layer that is disrupted, interrupted, has variable delay, or is intermittent at a seam-like point in its topology or at a point in time. Embodiments allow for the routing of packets below the affected routing layer that is transparent to the routing layer.

Figure 10:
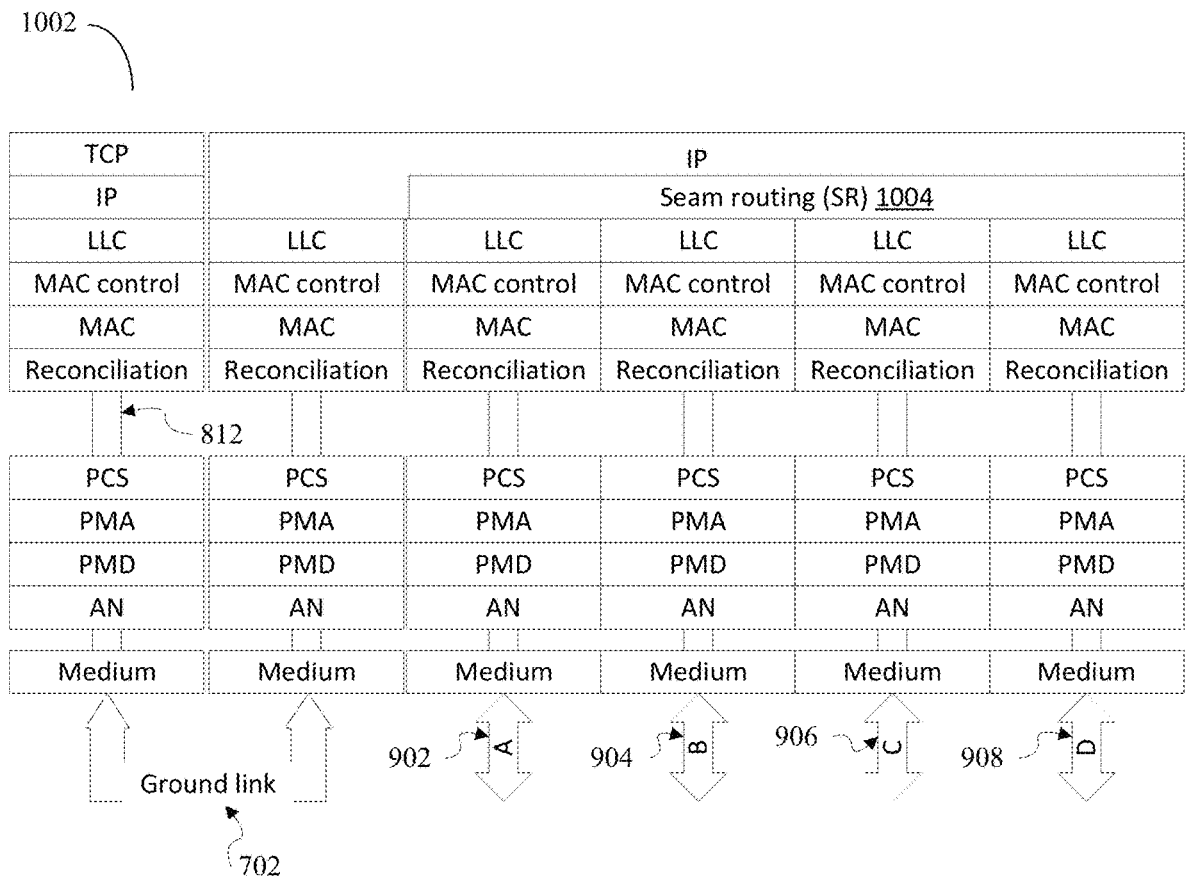
FIG. 10 illustrates a satellite protocol reference model including a seam routing layer according to an embodiment.

In embodiments, tunneling can be described in terms of the protocol model shown in FIG. 10. Comparing FIG. 9B to FIG. 10 there is a seam routing (SR) layer 1004 added between the physical (MAC) layer and routing (IP) layer of the protocol stacks for links 902, 904, 906, and 908. For the purposes of this description, the seam routing layer 1004 is shown as a thin intermediate layer below the IP routing layer. The seam routing layer 1004 is responsible for encapsulating (e.g. tunneling) incoming packets for transport along and across the seam as detailed below. Layers below the seam routing layer 1004 are illustrated using protocols that may be utilized in an Ethernet based network.

In embodiments, the scope of seam routing is between two nodes (satellites) that are on opposing sides of the orbital seam, in the case of a polar constellation, or at the upper or lower portions of a Walker-Delta constellation. The scope may also include the fifth link in the case of a Walker-Delta constellation.

Figure 11:
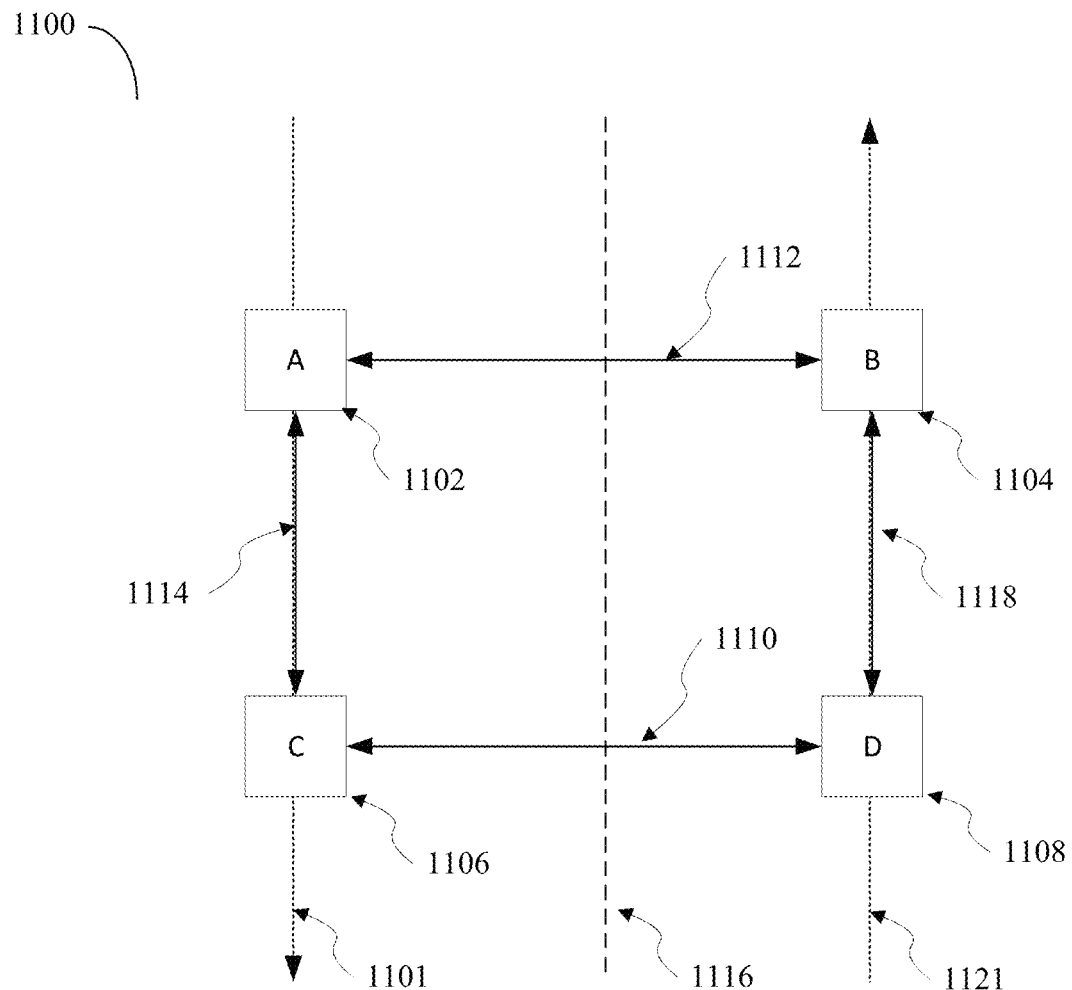
FIG. 11 illustrates a model for a seam routing layer according to an embodiment.

The behavior of embodiments at the seam may be illustrated in general terms with reference to a group of four satellites as shown in FIG. 11. Network node A 1102 and network node C 1106 are adjacent to each other in an orbit 1101. This orbit 1101 is located on one side of a portion of the network with dynamically changing topology such as a seam 1116 in a LEO satellite network. Network node B 1104 is located across the seam 1116 and is adjacent to network node A 1102 at this moment. Network node D 1108 is located adjacent to network node B 1104 on the same side of the seam 1116 and is located cross the seam 1116 and is adjacent to network node C 1106 at this moment. Network node B 1104 and network node D 1108 are located in orbit 1121. Network nodes A 1102, B 1104, C 1106, and D 1108 all contain hardware and software that allow them to be configured with a seam routing layer 1004 as illustrated in FIG. 10 between the MAC layer and the IP layer.

In an illustrative example, a first network node A 1102 receives data, such as a packet, that is to be routed to a second network node B 1104. The data packet includes routing information using a first protocol, such as IP. The first network node A 1102 reads the data and determines that the data is to be routed to the second network node B 1104. If IP layer routing is used, the destination of the IP packet indicates that the data packet is to be routed across a portion of the network over a link 1112 from network node A 1102 to network node B 1104 that is intermittently connected. In this example the link 1112 spans the seam 1116 so is only sporadically connected during the period of time that network node A 1102 is passing in proximity to network node B 1104. The status of link 1112 indicates if the link 1112 meets a communications criteria, such as if it is active or inactive, or if a link failure has occurred. If the link between these two network nodes is active, then the data may be transmitted freely between the two network nodes without requiring use of the seam routing layer 1004. In this case use of the seam routing layer 1004 and tunneling according to embodiments may be optionally used. If the link 1112 between network node A 1102 and network node B 1104 fails to meet the communications criteria, such as being inactive, then embodiments allow network node A 1102 to use tunneling at a second layer protocol, such as the seam routing layer 1004, to route data packets through a third network node C 1106 and network node D 1108 to network node B 1104 in a manner that is transparent to the IP routing layers as seen by network node A 1102 and network node B 1104. As the SR layer 1004 is below the IP layer, transmissions at the SR layer 1004 are transparent to the IP layer protocols.

Other embodiments may omit the use of source routing. If network node A 1102 cannot reach network node B 1104 but can reach network node C 1106, it forwards the packet to network node C 1106. If network node C 1106 can reach network node D 1108, it forwards the packet to network node D 1108.

In examples illustrated by FIG. 11, when network node B 1104 receives the packet, it terminates the seam routing layer 1004 tunnel and passes the packet to its IP layer for further routing. These examples appear as a transfer from network node A 1102 to network node B 1104 from the point of view of the IP layer, with the routing used at the seam routing layer 1004 being invisible to the IP layer.

Figure 12:
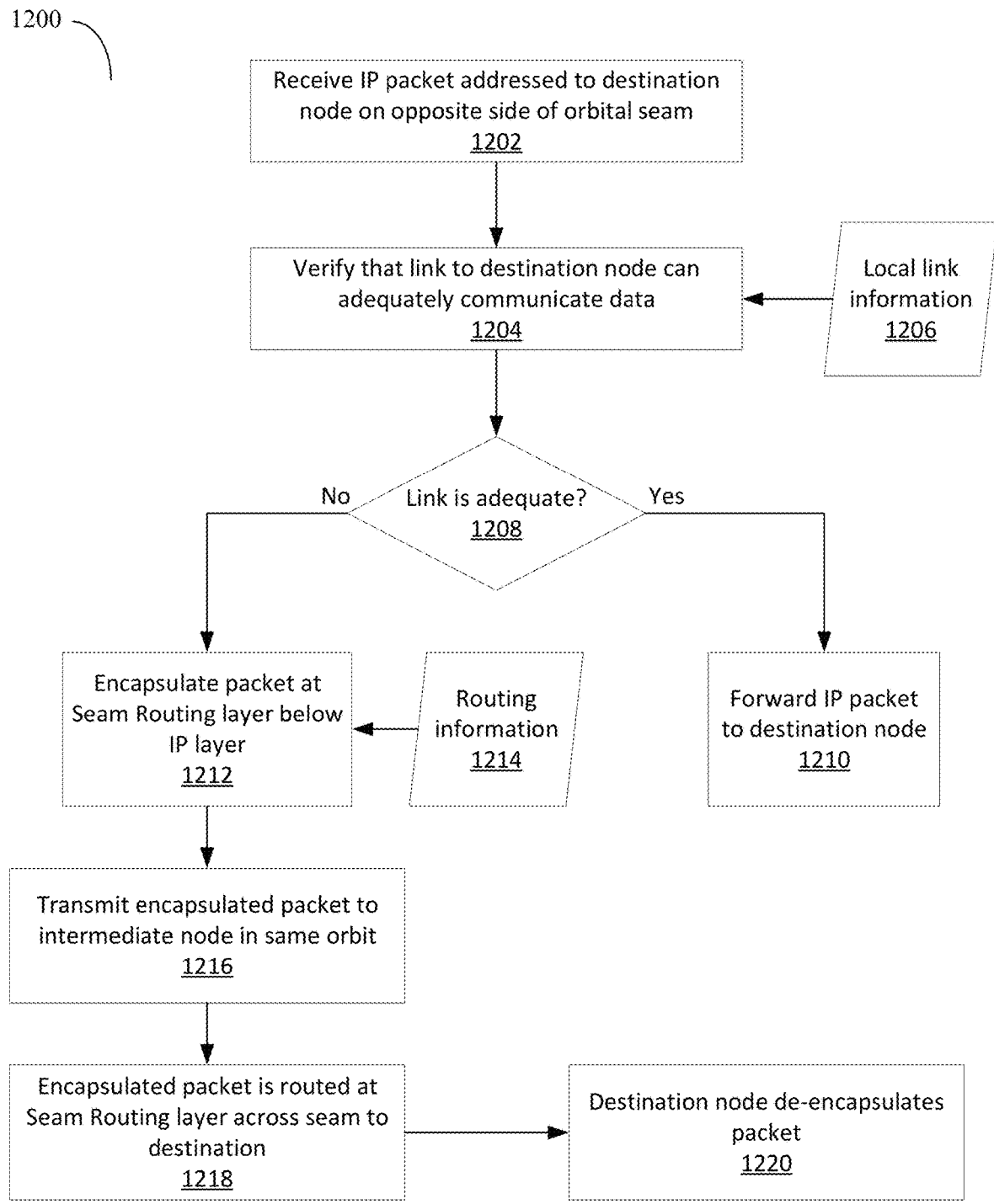
FIG. 12 illustrates an embodiment that makes use of the Ethernet layer to provide a switched tunnel through a direct active link across the seam according to an embodiment.
Figure 13:
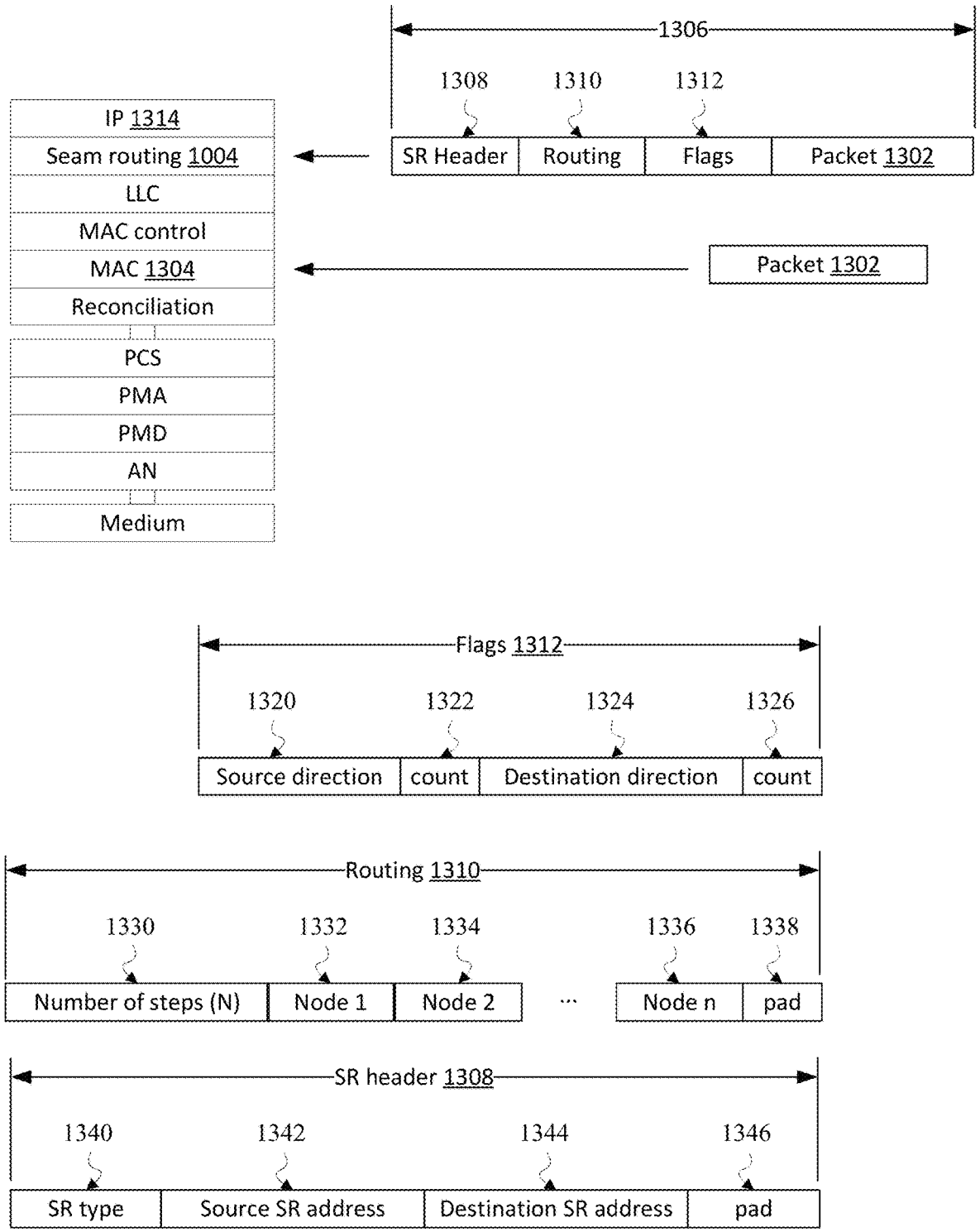
FIG. 13 illustrates an SR layer packet format according to an embodiment.

FIG. 12 illustrates a method of the embodiment of FIG. 11. In step 1202, network node A 1102 receives an IP packet addressed to a destination node on the opposite side of the orbital seam 1116. IP routing information indicates that the packet should be forwarded to network node B 1104. In step 1204, node A 1102 uses local link information 1206 to verify that the link to network node B 1104 meets communications criteria that allow the link to adequately communicate. This verification may be based on a simple link up or link down classification or may also take other communications criteria into account such as error rate, latency, or in the case of a link across a satellite orbit seam with predictable availability, time before the link is likely to go down. Link information 1206 may be obtained through a central or distributed controller, and may be based on meeting a criteria of the link including accessing a schedule, or including up/down status, error rate, etc. In step 1208, if the direct link across the seam 1116 is determined to be adequate, then network node A 1102 forwards the packet to network node B 1104 over link 1112. If the link 1104 is determined to be inadequate, then network node A 1102 uses the seam routing protocols to provide an alternate route to network node B 1104 for the packet at a layer below the IP layer that will be transparent to the IP layer. With reference to FIG. 13, in step 1212 the packet 1302 is encapsulated to form an encapsulated packet 1306, a seam routing (SR) header 1308 will be added to the packet as well as routing information 1310 obtained from source 1214, such as source routing information that defines the entire route from network node A 1102 to network node B 1104. Alternatively, the routing information 1310 may only route the encapsulated packet 1306 to the next hop, node C 1106. As network node A 1102 only has one link 1112 across the seam 1116, which has been determined to be inadequate for transmission, in step 1216 it then transmits the encapsulated packet 1306 to the next node in the same orbit, in this case network node C 1106. The act of encapsulating and transmitting the packet using seam routing protocols creates the tunnel from node A 1102 to node B 1104 which is supported by all participating network nodes. The encapsulated seam routing packet 1306 is then forwarded by node C 1106 across the seam 1116 to network node D 1108, and then on to network node B 1104. In step 1220, Network node D 1104 then de-encapsulates the packet 1306 and send it within its protocol stack to the IP layer for further processing towards the final destination of the packet 1302.

FIG. 13 illustrates the process of encapsulation of a packet 1302 by the seam routing layer 1004 with reference to the protocol stack of a link as shown in FIG. 10. The data unit used as a 'packet' 1302 at the MAC layer is an Ethernet frame which has a known format as defined by the Ethernet standard. For illustrative purposes, the Ethernet frame is referred to as a packet 1302. In normal operation, the packet 1302 is received by the IP layer 1314 for further processing as defined by the IP protocols. In embodiments, the packet 1302 is received by the seam routing layer 1004 before it reaches the IP layer 1314. The seam routing layer 1004 receives the packet 1302 from the MAC layer 1304 and encapsulates it. Encapsulation means that information used by the SR layer is appended to the packet 1302 to form an SR layer packet 1306 and route it through the network at the SR layer. The SR packet header includes SR header 1308, routing 1310, and flags 1312. The SR packet header information is received by the seam routing layers in network nodes and interpreted used by the seam routing layer 1004 to route the encapsulated packet 1306 through the network. The seam routing layers process the encapsulated packets

1306 before they reach the IP layer so that routing at the seam routing layer is transparent to the IP layer. In other words, the IP layer is unaware of the routing of the encapsulated packet 1306.

SR header 1308 includes an SR type flag 1340, a source SR address 1342, a destination SR address 1344, and a pad 1346. SR type 1340 may refer to a particular configuration of the satellite constellation, such as polar constellation or Walker-Delta constellation or the class of SR layer topology. SR type 1340 may also be used to indicate whether the content of the packet consists of an encapsulated packet 1302 (routing information), or if the message is a control message that maybe exchanged between controllers for the purposes of optimizing SR layer protocol operations. The source SR address 1342 and the destination SR address 1344 are addresses of the node that encapsulates packet 1302 and de-encapsulates packet 1302, respectively. The address used may be specific to the SR layer, an IP address, a MAC address, or another identifier for the source and destination nodes at the SR layer. Pad 1346 may be used to additional bits to produce a fixed length SR header field 1308 depending on the implementation of encapsulated packet 1306.

Routing field 1310 includes information such as a number of steps (N) 1330, a list of nodes 1332, 1334, . . . , 1336, and a pad field 1338. Number of steps 1330 is the number of steps, also known as hops, that the encapsulated packet 1306 must make being transmitted from the SR source node 1102 to the SR destination node 1104. The node fields, 1332, 1334, . . . , 1336 indicate the SR layer addresses of the nodes that the encapsulated packet 1306 must traverse to reach its destination 1104. Pad 1338 may be used to additional bits to produce a fixed length routing field 1310 depending on the implementation of encapsulated packet 1306.

Figure 14:
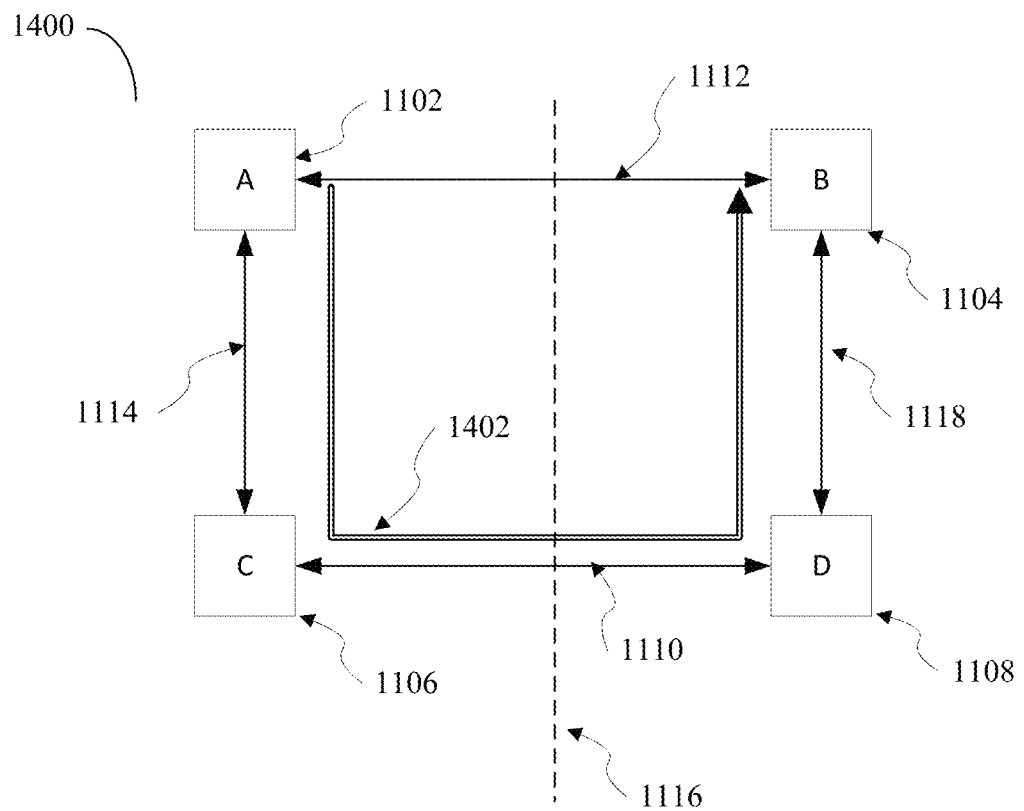
FIG. 14 illustrates a route taken by a packet at the seam routing layer according to an embodiment.

Flags field 1312 includes information such as the source direction 1320, count 1322, destination direction 1324, and count 1326. Source direction 1320 indicates the direction of travel of source node 1102 within its satellite orbit. Destination direction 1324 indicates the direction of travel of destination node 1104 within its satellite orbit. Counts 1322 and 1326 are provided for the source direction 1320 and the destination direction respectively 1324. The count fields indicate how many nodes should be traversed before attempting to cross the seam. This may be used to reduce the processing and to manage the traffic over a single link. For example, although the usual case is to traverse a single satellite path to the next satellite as illustrated in FIG. 14, if the sending controller knows that that link is down, it could then send to the second, or further, node as in FIG. 19B, without the second node having to further process or re-encapsulate the packet a second time. The use of the count field allows the sending node to distribute traffic over multiple links as a form of local traffic management.

In some embodiments, the routing information 1310 includes a MAC address in order to route the packet at the SR layer.

As illustrated in FIG. 14, if a packet is routed at the seam routing layer 1004 it is transparent to the IP layer. In embodiments an IP layer packet may be routed at the IP layer from network node A 1102 to network node B 1104. However, in order to cross the seam 1116, the seam routing layer 1004 may form a tunnel 1402 by taking the packet 1302 at the seam routing layer in network node A 1102, forming an encapsulated packet 1306, and routing the encapsulated packet at the seam routing layer through network nodes C 1106 and D 1108 to network node B 1104. At network node B 1104, the encapsulated packet 1306 is de-encapsulated (the seam routing header 1308 and the routing information 1310 is removed) and the remaining packet 1302 is passed to the IP layer of network node B 1104. From the point of view of the IP layer 1314, the packet 1302 has passed from network node A 1102 to network node B 1104 and it is unaware of the route that was taken in the tunnel 1402 at the seam routing layer 1004.

Figure 15:
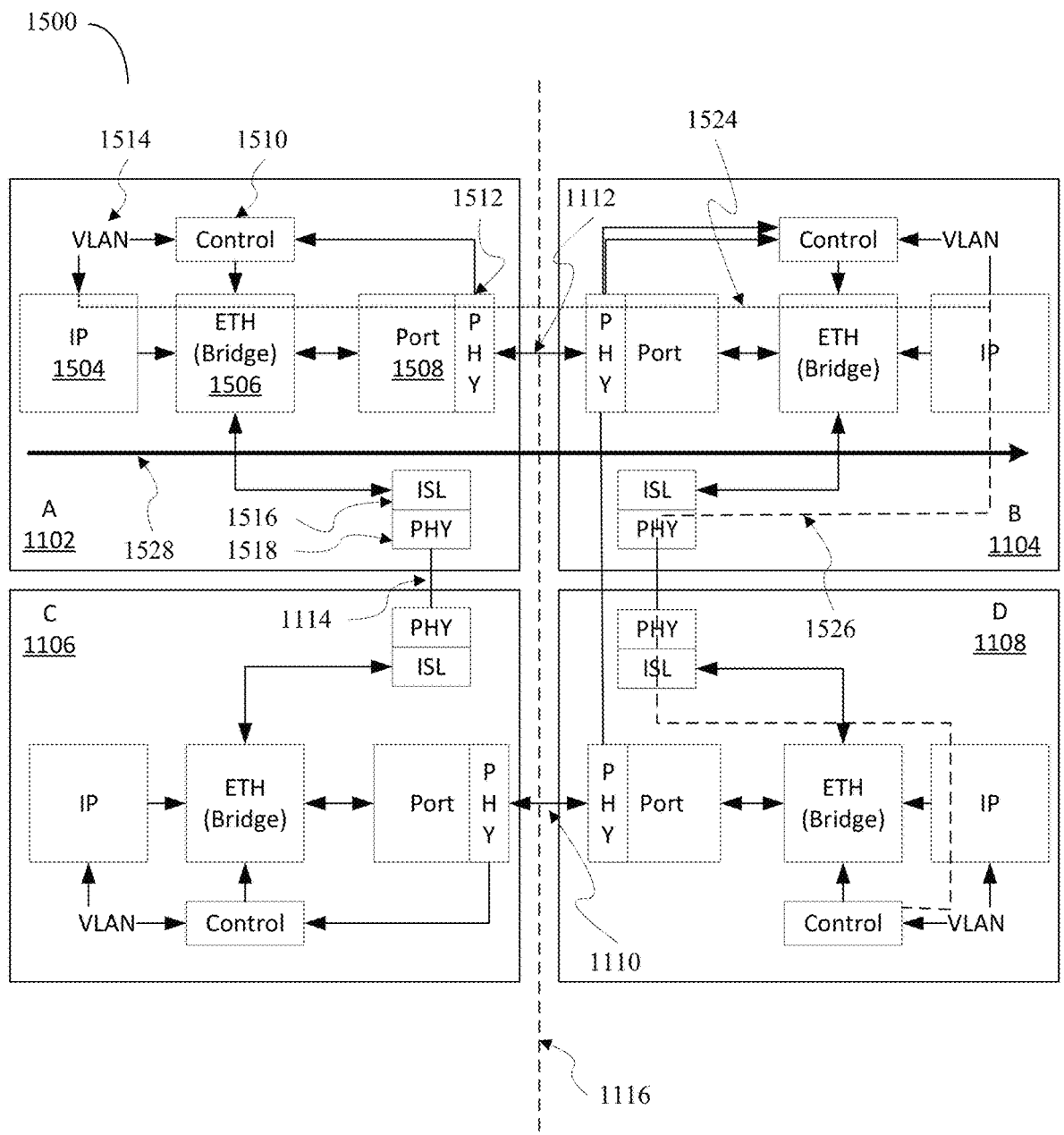
FIG. 15 illustrates details of hardware and software components of satellite nodes when data is routed directly across a seam at the IP layer according to an embodiment.
Figure 16:
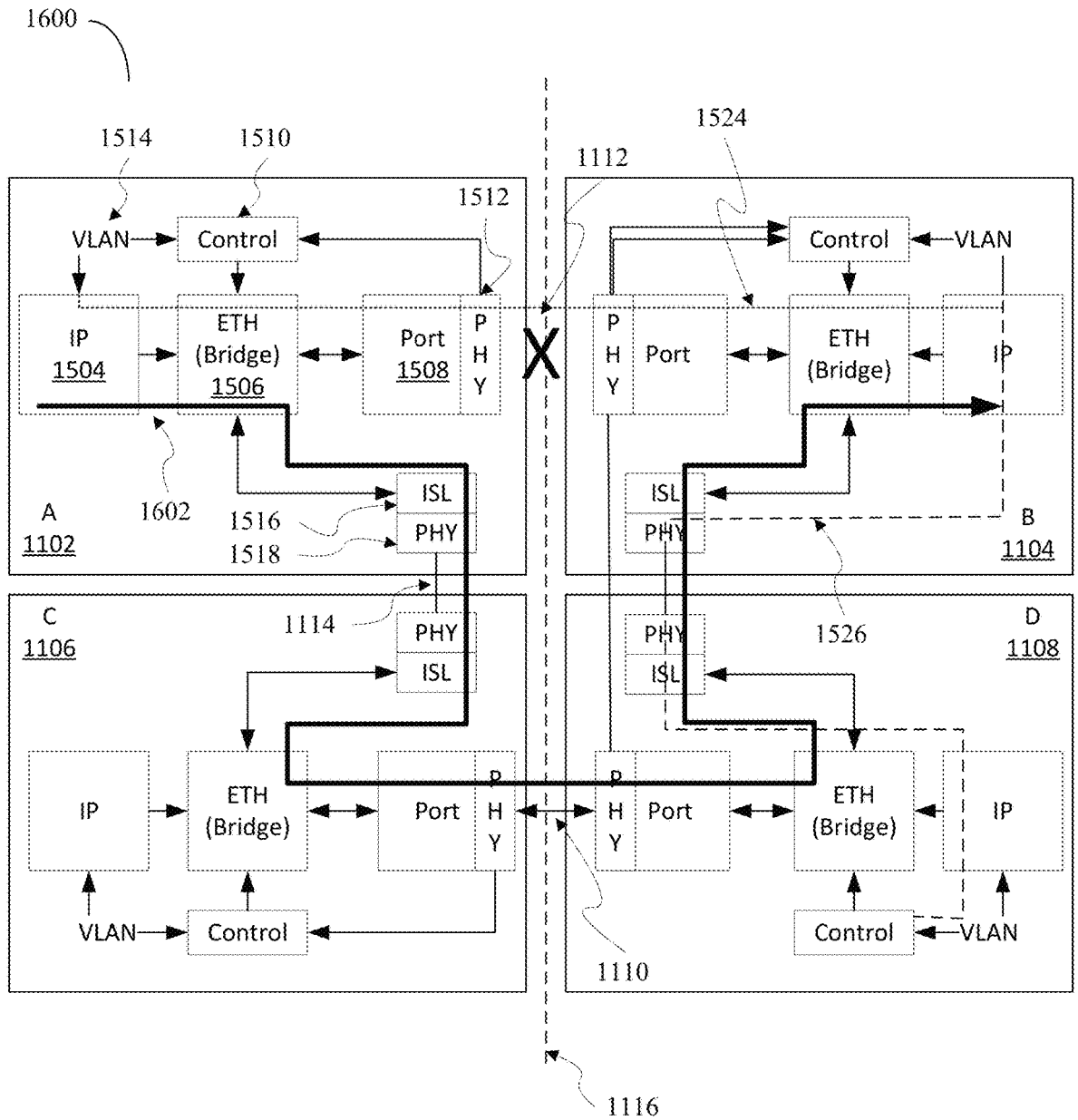
FIG. 16 illustrates details of hardware and software components of satellite nodes when data is routed across a seam at the SR layer according to an embodiment.

FIGS. 15 and 16 provide further details as to how switching at the seam routing layer 1004 may work by forming a dynamic bridged network across the seam 1116 or another network portion with dynamically changing topology. FIG. 15 illustrates the four network nodes as shown in FIG. 11, namely network nodes A 1102, B 1104, C 1106, and D 1108, with network nodes A 1102 and C 1106 adjacent in an orbit on one side of seam 1116 and network nodes B 1104 and D 1108 adjacent in another orbit on the opposite side of seam 1116. At a point in time, network node A 1102 and network node B 1104 are in communication across link 1112. Similarly, network nodes C 1106 and D 1108 are in communication across link 1110. Each network node is shown with two physical layer network interfaces. One physical network interface comprises a port 1508 and a physical (PHY) interface 1512 and provides link 1112 across the seam 1116. The other physical network interface comprises an ISL 1516 with an associated PHY 1518 to provide intra-orbit link 1114. Each node further comprises an IP layer 1504, an Ethernet bridge 1506 layer, and a control 1510 block. The control 1510 receives status information from the PHY 1512 that may include information such as the status of link 1112, such as whether it is available or not. The control 1510 also provides input to the Ethernet bridge 1206. Each of the four network nodes has a similar architecture including an IP layer, Ethernet layer, and multiple physical layer hardware and software. The Ethernet bridge 1506 allows for the forwarding of Ethernet frames between network segments in a manner that is transparent to the upper IP layer. In this embodiment, network segments may be a first link between network node A 1102 and network node B 1104, and a second link between network node A 1102 and network node C 1106. Other links may also be supported, for example two intra-orbit links may be present to allow bridging to a satellite ahead or behind in the same orbit. FIG. 15 illustrates the case where the direct link 1112 across the seam 1116 is active and may be used for data communications. FIG. 16 illustrates how when direct link 1112 is inactive or down, Ethernet bridging may be used to forward data packets from network node A 1102, to network node C 1106, across the seam 1116 via link 1110 to network node D 1108, and finally to destination network node B 1104 using Ethernet bridging protocols in a manner that is transparent to the IP layer that only sees the transmission from network node A 1102 to network node B 1104.

Figure 17:
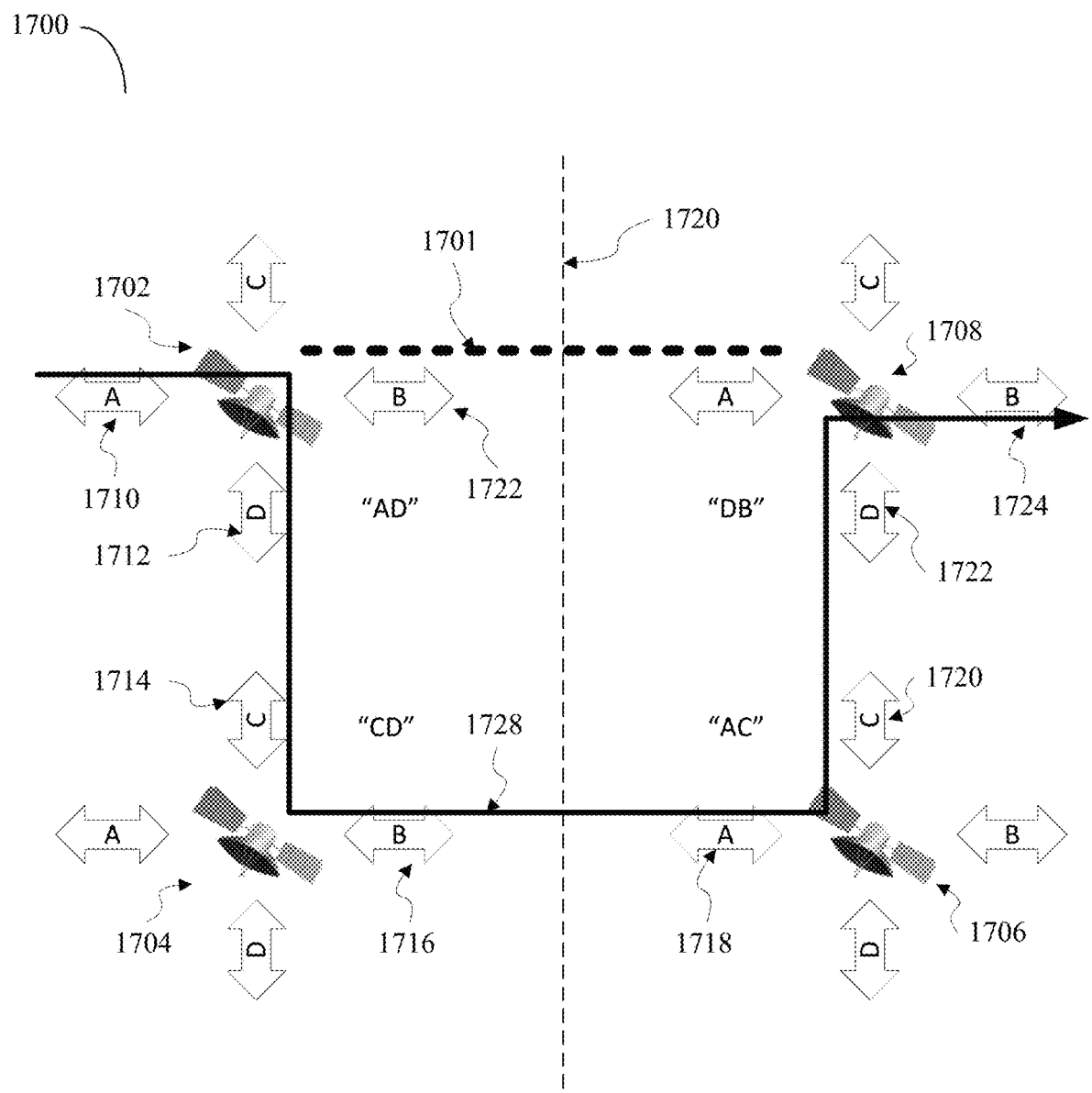
FIG. 17 illustrates the satellites and links when routing across a seam according to an embodiment.

The behavior of embodiments at the seam 1720 may be illustrated with reference to a group of four satellites as shown in FIG. 17. FIG. 17 illustrates four satellites 1702, 1704, 1706, 1708 in a configuration that illustrates their relative locations in relation to the seam 1720. In FIG. 17, the data path 1728 is from left to right. Packets that enter the satellite 1702 on interface A 1710 would normally be routed at the IP layer to the next satellite 1708 over interface B 1722 of satellite 1702 that interfaces to link 1701. At receiving satellite 1708, the incoming packet would be received from link 1701 on interface A and forwarded over interface B 1724 to the next satellite (not shown) of the end-to-end route. In terms of the protocol, when described as an OSI model would show the packet being routed at the IP layer of the protocol stack. However, other implementations may use other protocols for routing.

There are cases where the direct link 1701 from satellite 1702 to satellite 1708 cannot be used, such as when the network dynamically changes and link 1701 becomes unavailable. Routing of packets at the IP layer is based on the topology known to the IP layer. In the case that the direct link 1701 cannot be used, until the new topology has been updated throughout the network by a link-state flooding event, a packet that would normally be sent from satellite 1702 to satellite 1708 could be lost. In embodiments, the seam routing layer 1004 may utilize the status of the links of satellites 1702, 1704, 1706, and 1708 to mitigate the effect of the loss of direct link 1701. The seam routing layer 1004 will take packet 1302 and form an encapsulated packet 1306 with a seam routing header 1308 and routing information 1310. The routing information 1310 will indicate that the path taken should be via satellites 1704 and 1706 before being received by satellite 1708, where the link between satellite 1704 and satellite 1706 is across the seam 1720. In this example, satellite 1702 will then forward the encapsulated packet 1306 to satellite 1704 via interface D 1712. Satellite 1704 will detect the seam routing layer header 1308 and decode the routing information 1310. If the link between satellite 1704 and satellite 1706 is available, it will then forward the encapsulated packet 1306, complete with seam routing header 1308, via interface 1716. Similarly, at satellite 1706, the encapsulated packet 1306 will be sent to destination satellite 1708. At satellite 1708, the node will decode the seam routing layer header 1308 and determine that it is the original destination node for packet 1302 and will then de-encapsulate the encapsulated packet 1306 to obtain the original packet 1302 to send to the higher routing layer. The packet 1302 will then be forwarded to the appropriate next node via interface B 1724.

A protocol model showing the use of the seam routing layer 1812 from satellite 1702 to satellite 1708 where the IP network routing is attempting to route a packet from satellite 1702 to satellite 1708 when link 1701 cannot be used is shown in FIGS. 18A through 18D.

Figure 18A:
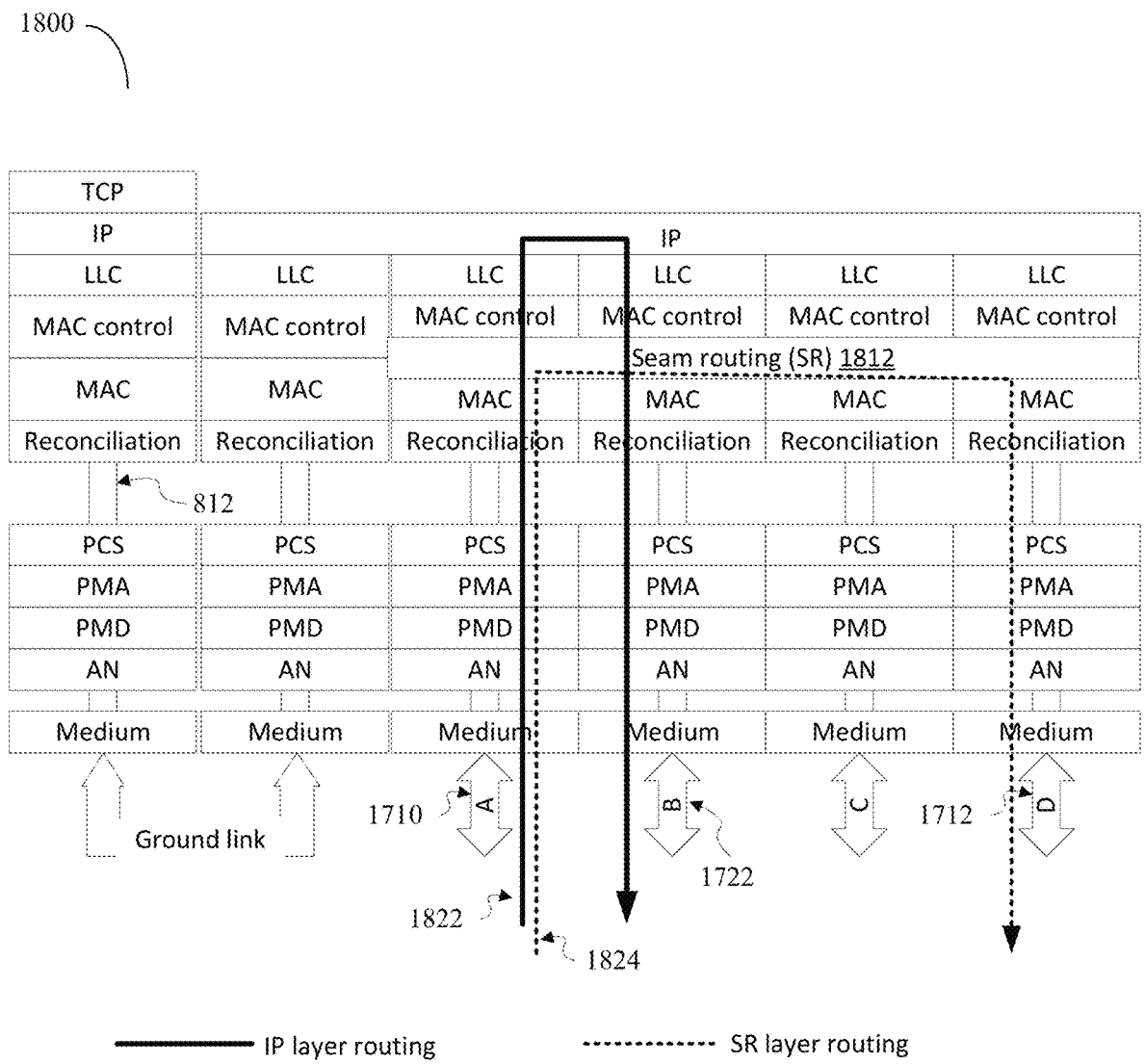
FIG. 18A, FIG. 18B, FIG. 18C, and FIG. 18D illustrate protocol reference models for the satellites and routing of FIG. 17 according to an embodiment.

FIG. 18A illustrates the protocol stack interactions used to transfer a data packet from interface A 1710 to interface D 1712 of satellite 1702. End-to-end data transfer is routed at the IP layer using IP addresses. At the IP layer, routing is from interface A 1710 to interface B 1722 of satellite 1702 which is the direct route across the seam 1720 to satellite 1708. This IP layer route 1822 goes from interface A 1710 up the protocol stack 1800 to the IP layer and down to interface B 1722. In this example, the interface B 1722 across the seam cannot be used so the packet 1302 arriving on interface A 1710 is encapsulated at the seam routing layer 1812 and the encapsulated packet 1306 is routed to an alternate link D 1712 in a manner that is transparent to the IP layer. In this embodiment the seam routing layer 1812 is between the MAC layer and the MAC control layer and seam routing is transparent to the MAC control layer.

Figure 18B:
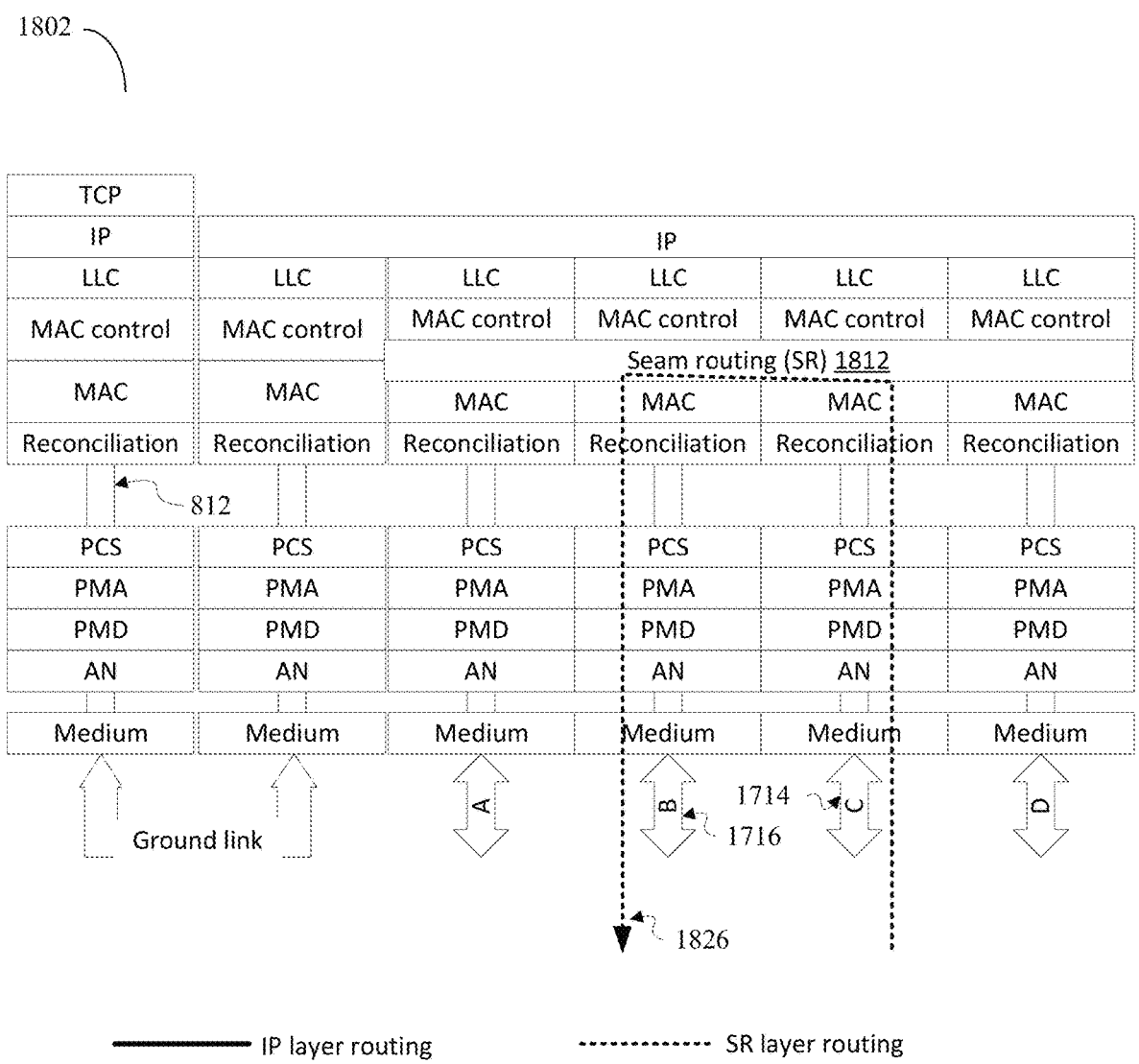
Figure 18C:
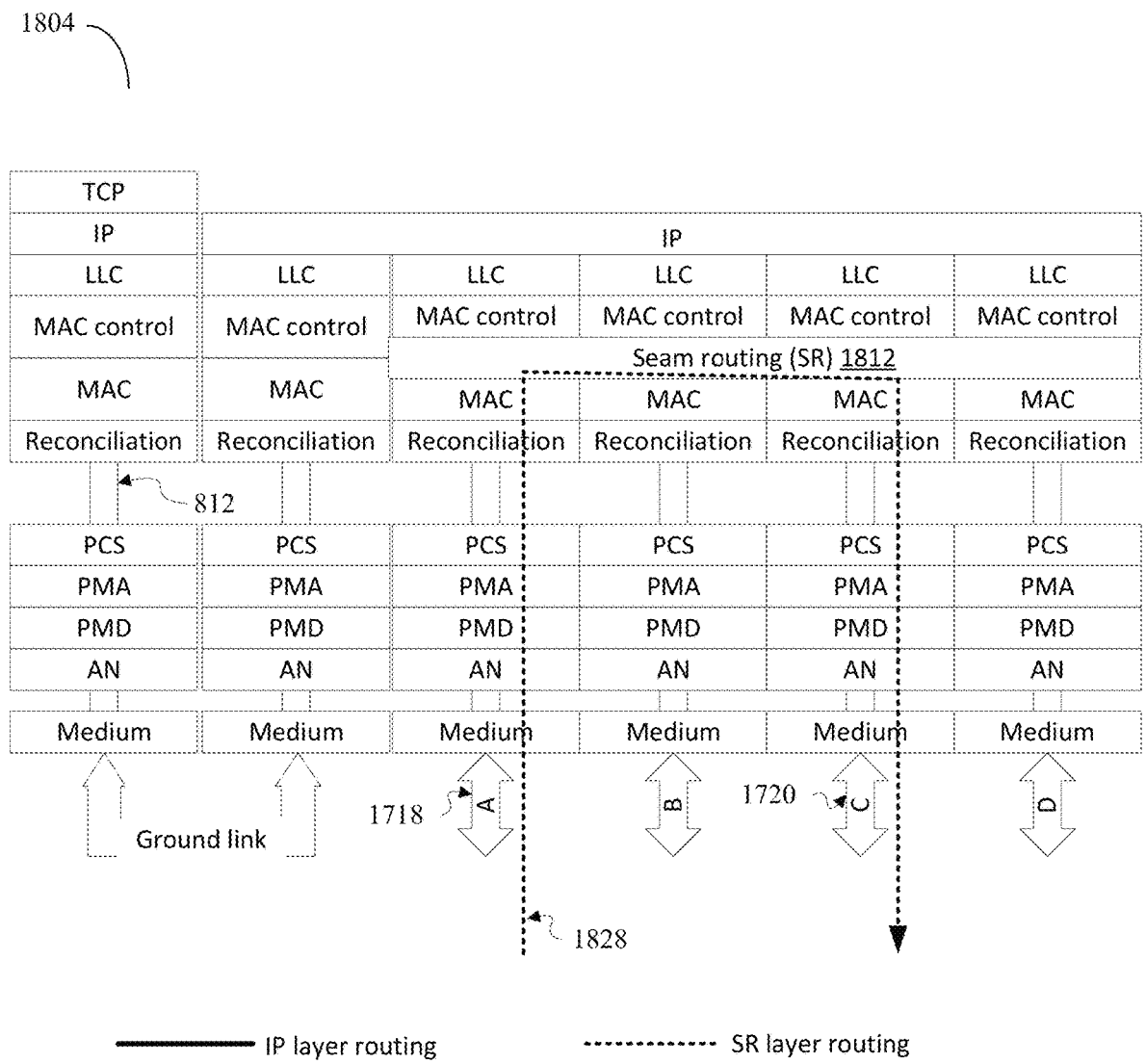
Figure 18D:
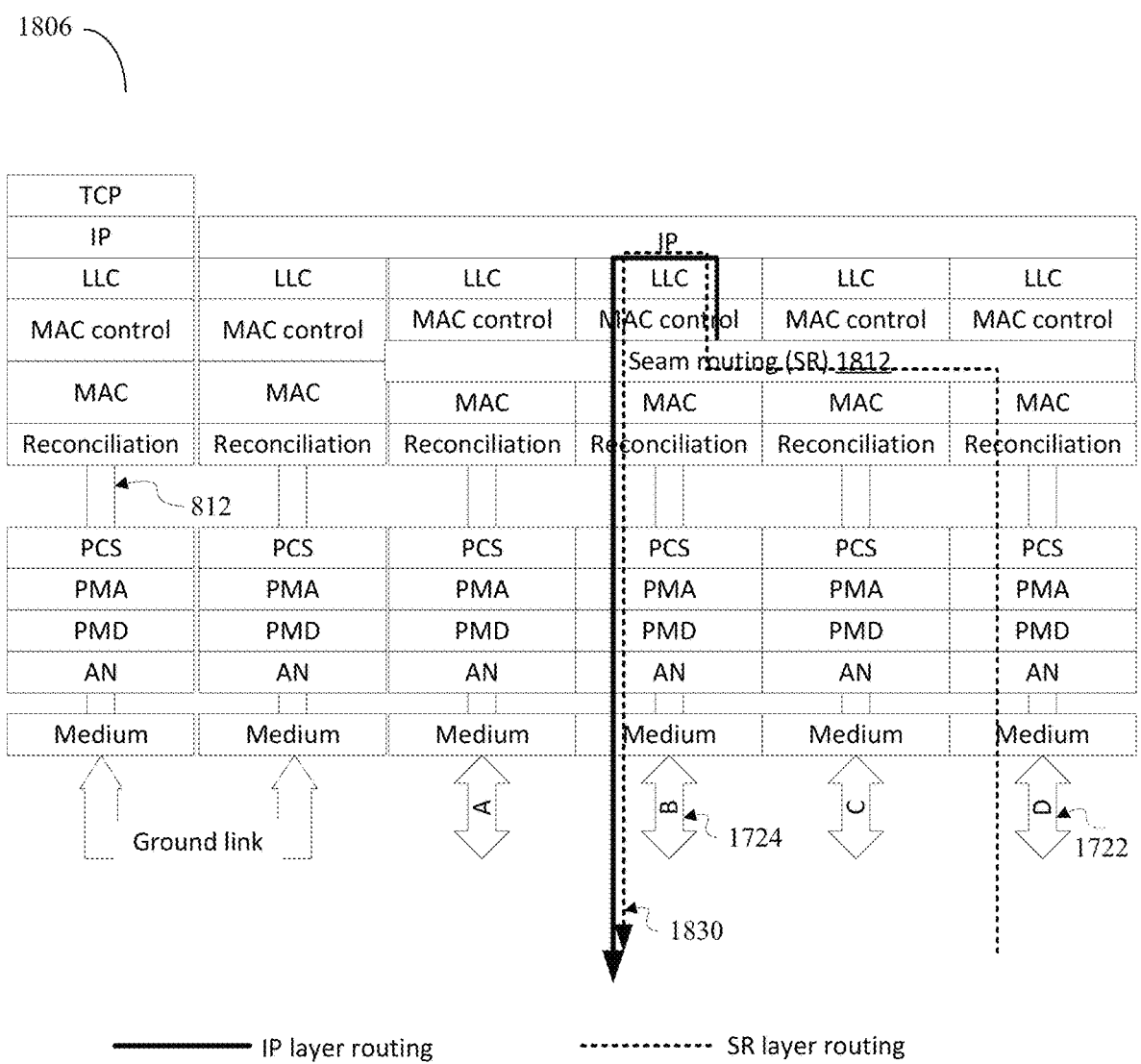

FIG. 18B illustrates the protocol stack interactions used to transfer the encapsulated packet 1306 from interface C 1714 to interface B 1716 of satellite 1704. Routing at satellite 1704 is specified by the seam routing information 1310 and done at the seam routing layer 1812 and is transparent to the IP layer. FIG. 18C illustrates the protocol stack interactions used to transfer the encapsulated packet 1306 from interface A 1718 to interface C 1720 of satellite 1706. Routing at satellite 1706 is also done at the seam routing layer 1812 and is transparent to the IP layer. FIG. 18D illustrates the protocol stack interactions to receive the encapsulated packet 1306 at interface D 1722 and transmit the de-encapsulated packet 1302 at interface B 1724 of satellite 1708. Seam routing layer routing is terminated at the seam routing layer 1812 of satellite 1708. The encapsulated packet 1306 is de-encapsulated at the seam routing layer 1812 to obtain the packet 1302 that is passed to the IP layer for further processing.

Figure 19A:
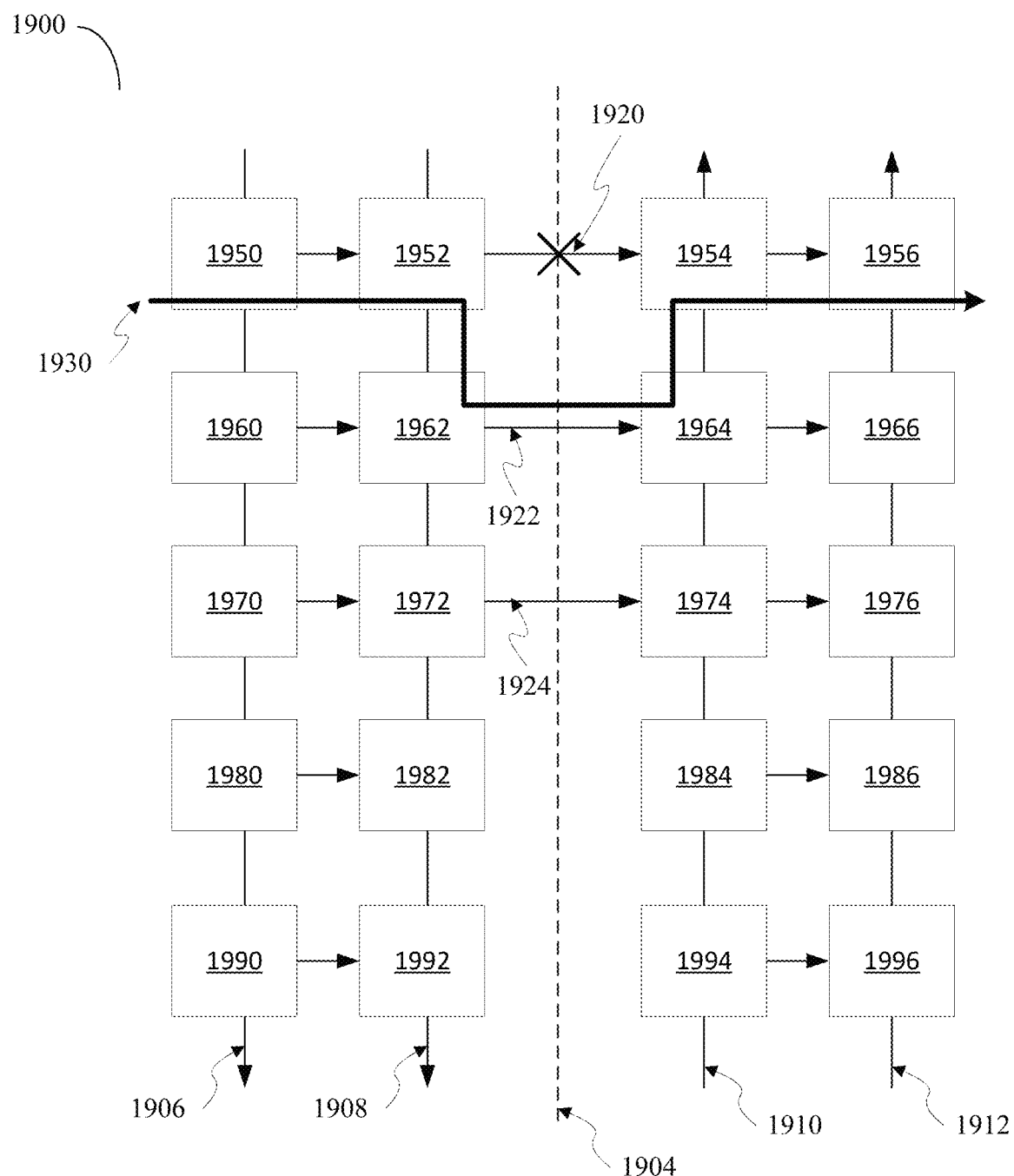
FIG. 19A, FIG. 19B, FIG. 19C, and FIG. 19D illustrate example embodiments of routing across a seam according to embodiments.
Figure 19B:
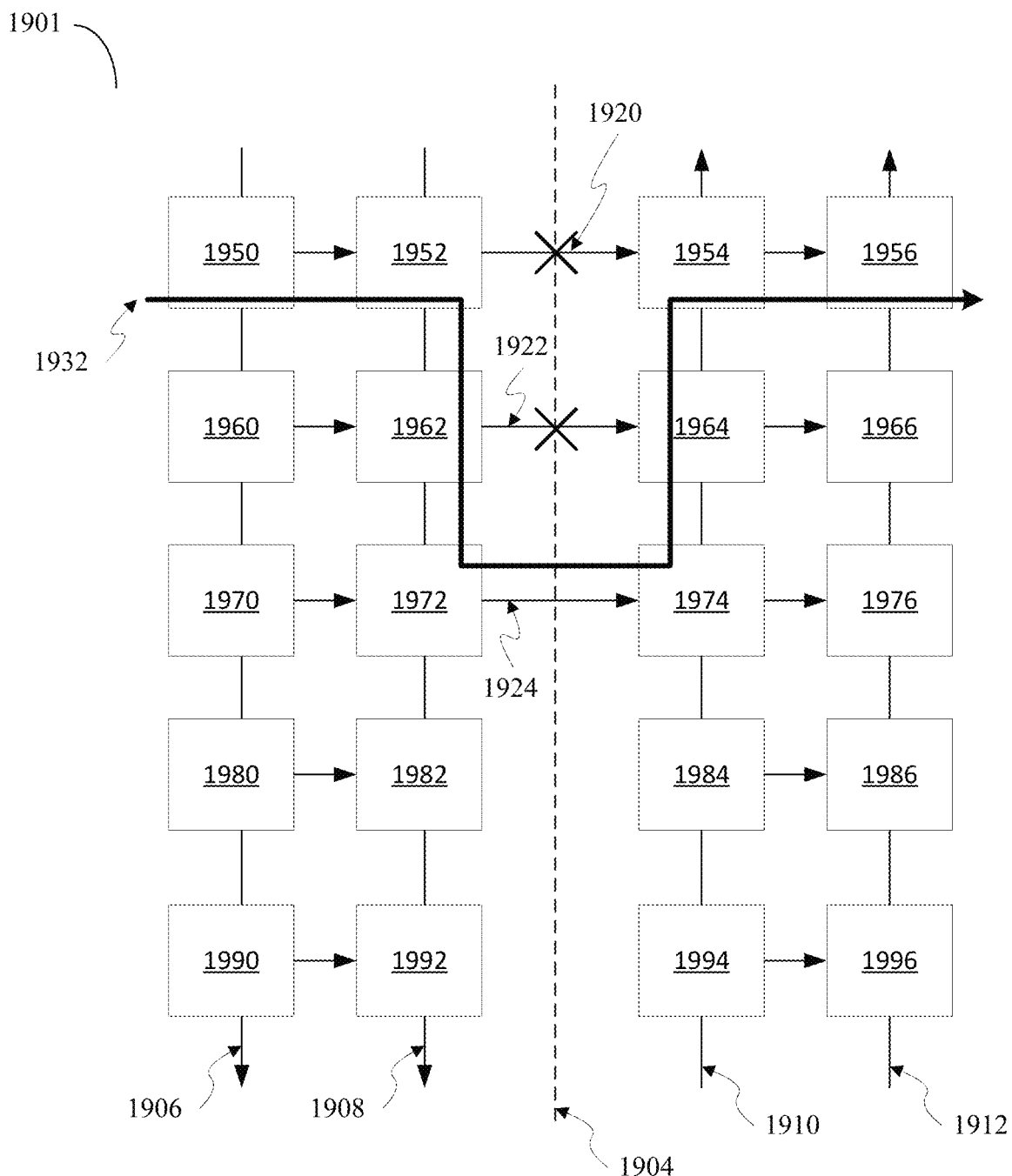
Figure 19C:
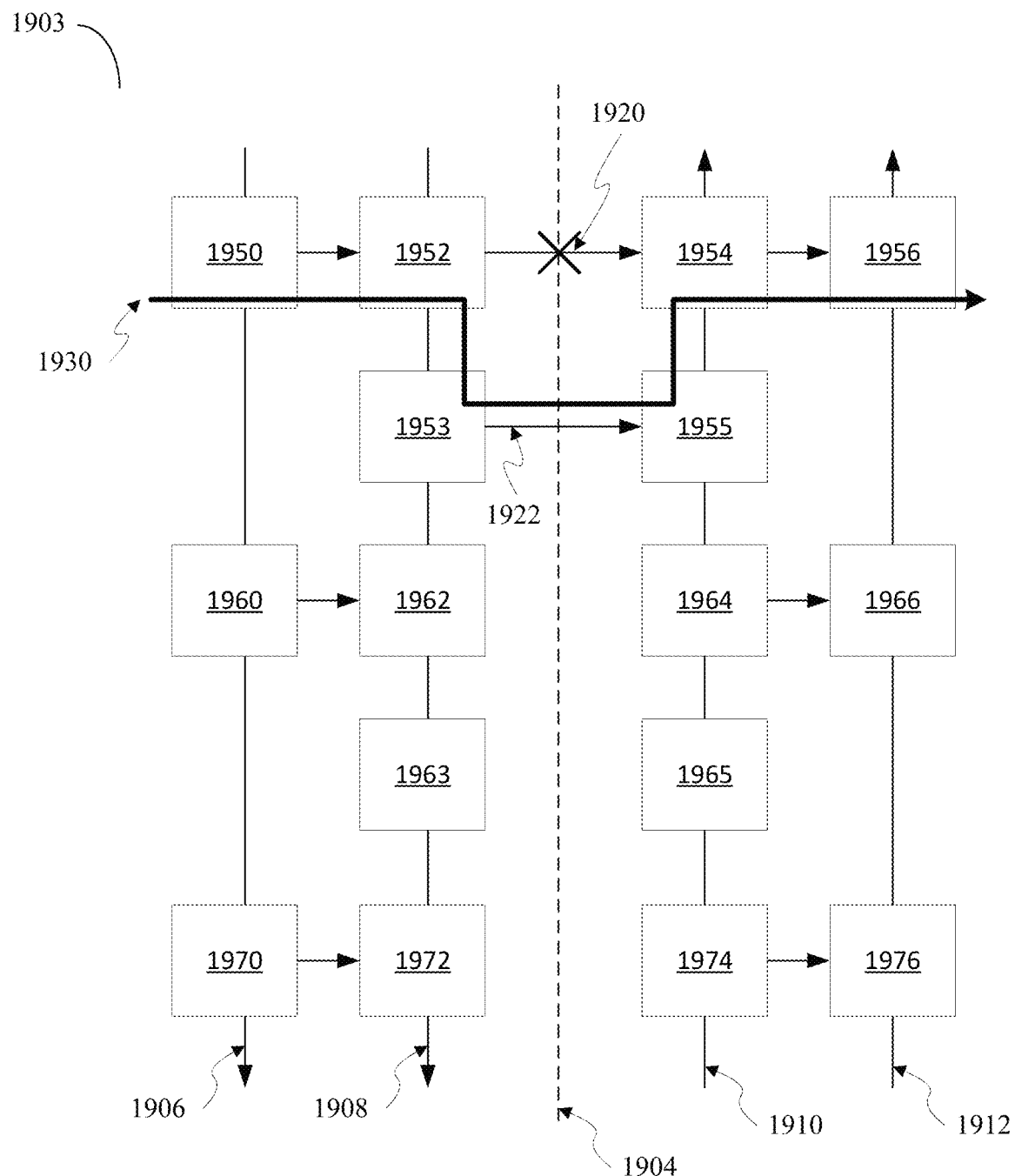

FIG. 19A, FIG. 19B, and FIG. 19C illustrate example embodiments of routing across a seam 1904. These FIGS. illustrate a topology of four parallel satellite orbits 1906, 1908, 1910, 1912 with five satellites in each orbit. Orbits 1908 and 1910 are adjacent to the seam 1904 with dynamically changing topology as satellites in orbits 1906 and 1908 are moving in a southerly direction and satellites in orbits 1910 and 1912 are moving in a northerly direction. Satellites in orbits 1908 and 1910 comprise hardware and software to implement seam routing layer 1004 or 1812 in their protocol stacks as shown in FIG. 10 and FIG. 18A through FIG. 18D. Satellites in orbits 1906 and 1912 are not adjacent to the seam 1904 and are not required to implement a seam routing layer (1004 or 1812) and may have protocol stacks as shown in FIG. 9B.

FIG. 19A illustrates an embodiment where link 1920 cannot be used and communications between satellite 1952 and satellite 1954 may be routed by the seam routing layer through link 1922 through satellite 1962 and satellite 1964. IP layer routing may be used between satellite 1950 and satellite 1952. Seam layer routing is used in a tunnel between satellite 1952, 1962, 1964, and 1954. IP layer routing may then be used again between satellite 1954 and satellite 1956.

FIG. 19B illustrates and embodiment where both link 1920 and link 1922 across seam 1904 cannot be used. Satellite 1952 has information from protocol layers below the IP layer that link 1920 cannot be used and uses seam routing protocols to forward packets to satellite 1962. As part of the seam routing protocols packets are encapsulated with seam routing headers 1308 and source routing information 1310 to form encapsulated packets 1306 and route the encapsulated packets 1306 over link 1922. However, at satellite 1962 link 1922 also cannot be used. Therefore satellite 1962 may further process or encapsulate the already encapsulated packets 1306 to route the twice encapsulated packets through satellite 1972, satellite 1974, then back to satellite 1964. Satellite 1964 will de-encapsulate the twice encapsulated packet to obtain the encapsulated packet 1306 as it was encapsulated by satellite 1952. The encapsulated packet 1306 is then sent to satellite 1954 which further de-encapsulates the packet to obtain the packet 1302 and forwards it to its IP layer for further processing.

FIG. 19C illustrates an embodiment where additional satellites are placed in orbits 1908, 1910 adjacent to the seam 1904 to facilitate transmission across the seam 1904 with dynamically changing network topology. In this embodiment satellites 1953, 1963, 1955, and 1965 have been added to orbits 1908 and 1910 adjacent to seam 1904. These satellites are configured to communicate intra-orbitally with satellites in the same orbit, such as satellite 1952, 1962 and 1972, and across the seam 1904, for example between satellite 1953 and satellite 1955. Satellites such as satellite 1953 may but are not required to communicate inter-orbitally to satellites in orbits 1906 not adjacent to the seam 1904. Topologies such as shown in FIG. 19C allow for a higher density of satellites across the seam 1904 and allow for extended periods of connections between satellites on opposite sides of the seam 1904 using direct communications at the IP layer and at the seam routing layer.

Figure 19D:
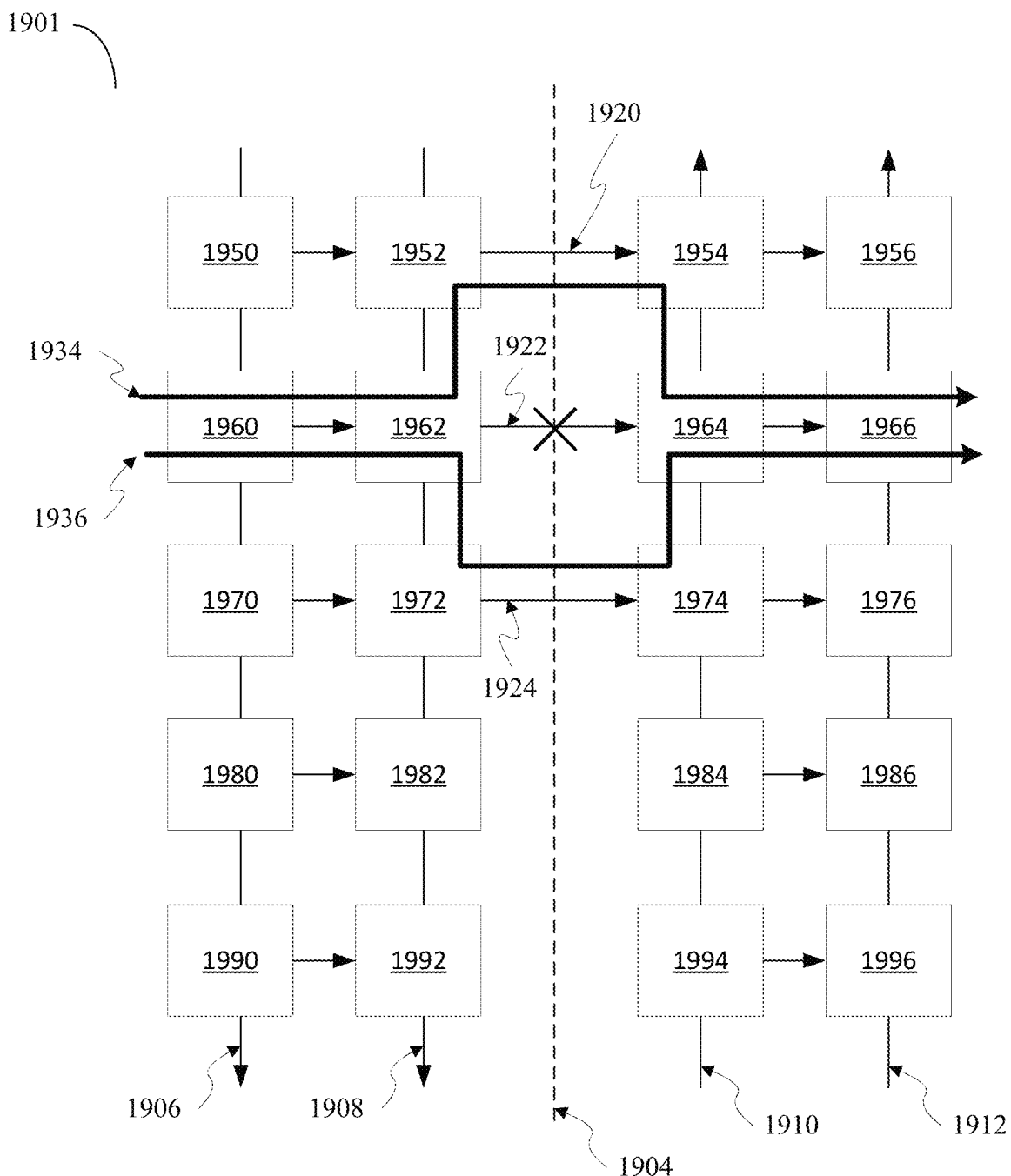

FIG. 19D illustrates an embodiment where redundancy is used to increase the reliability or decrease latency of transmissions across the seam 1904 with dynamically changing network topology. In this embodiment a packet is routed from satellite 1962 to satellite 1964 across seam 1904, for which direct transmission is presently degraded. Satellites 1962 is configured to route multiple copies of the packet at the SR layer. SR route 1934 routes the packet through satellite 1952, across seam 1904, through satellite 1954, then to satellite 1964. Similarly, SR route 1936 routes a copy of the packet through satellite 1972, across seam 1904, through satellite 1974, then to satellite 1964. Satellite 1964 may receive two copies of the packet through SR layer route 1934 and 1936, and may compare them for error, or simply discard the later arriving packet if it is determined to be a duplicate of the first packet. If an error is detected error correcting protocols such as requesting a retransmission at the SR layer may be implemented. In embodiments, the SR header 1308 may be expanded to support the example of FIG. 19D. SR type 1340 or flag field 1312 may be expanded to indicate that multiple copies of an encapsulated packet 1306 have been transmitted. SR header 1308 may also have a counter, such as a 2-bit or 4-bit counter, that can be used to add a serial number to each copy of the encapsulated packet 1306. Receiving satellite 1964 may examine the flag to know that multiple copies of encapsulated packet 1306 have been transmitted and then examine the serial number of the received encapsulated packets. If a second packet with same serial number is received, it may be discarded as a copy.

Figure 20:
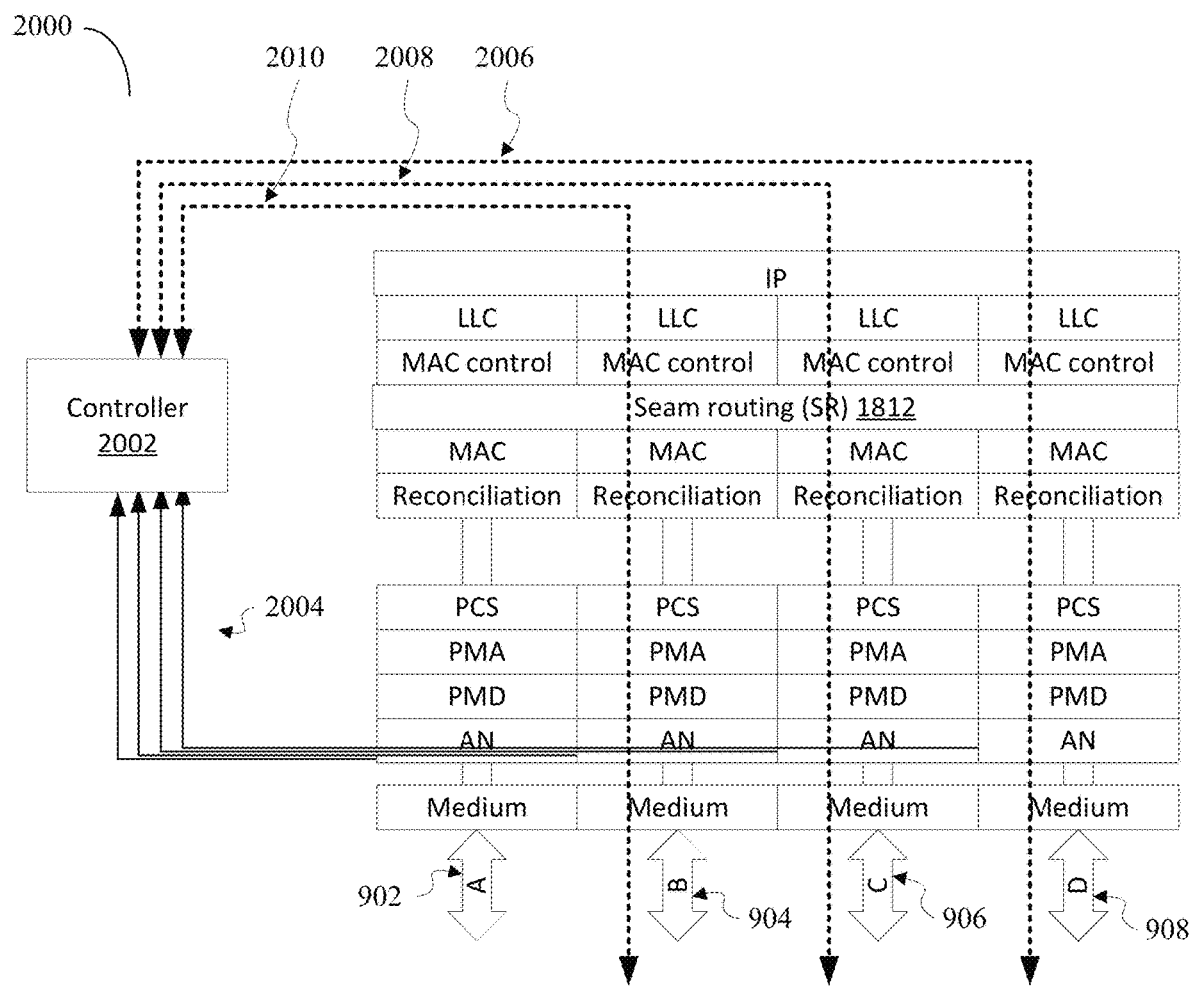
FIG. 20 illustrates a protocol reference model that includes a controller function according to an embodiment.

FIG. 20 illustrates how controllers can be interconnected within the network. Each satellite will have a controller function (e.g. software function) that interfaces and can manage the seam routing layer. Each controller function will have inputs from peer nodes that are participating in the seam routing layer. Each controller is effectively connected to its peer, though link and control information can be exchanged with any other controller to effectively manage seam layer protocols. Note that FIG. 20 is from the point of view of satellite 1702, so communication is only shown through interfaces B, C and D. Controllers have access to the routing system and link routing information and receive status information from the physical layer of each interface in order to determine seam routing layer paths. The controller 2002 may be in communications with satellites on both sides of the seam and may also distribute link control and status information between satellites on both sides of the seam.

Messages may be passed between controllers using SR layer packets with the SR type 1340 set to indicate that the packet is a control message. Control messages can be used for any number of management purposes. Control messages may be used to indicate the loss or recovery of a physical interface. By communicating events using SR layer control messages controllers can have access to information, such as interface state, in a way that is faster than what would normally be provided by a traditional link-state advertisement message exchange at the IP layer.

Control messages can be directed to a single (e.g. next node) or sent to all nodes either in a single direction (i.e. around an orbit), or in all directions, which may also include ground facing links. Directional information may be encoded or indicated within the control message itself or could be an additional SR type 1340. In embodiments, a single bit SR type 1304 is used as it allows faster processing in hardware. Other embodiments allow for multi-bit SR types to support a greater number of SR message types.

When link hardware detects a failure, it is detected by the controller, and the controller will then encapsulate the data along with any link information on a pre-computed path, and set the SR header 1308, routing 1310, and flags 1312 appropriately. Once the controller detects that the IP routing system has been updated, it will then cease forwarding packets.

When the controller receives a packet requiring processing at the SR layer, the controller will read the header and forward across the seam. If the seam link is absent, then the controller will update the header information to allow the next satellite to be used to cross the seam. When the controller receives a packet that is destined for that specific node, it will read the IP header information, strip the SR layer header and forward to the next node as per the IP header.

Some control information is needed by the controller to allow optimization of processing. For example, when a controller detects that a link crossing the seam is down, the controller may generate a broadcast message with a local system timestamp that can be read by all controllers on the seam. Likewise, a similar message is broadcast when a link comes up. This will allow the seam controllers to predict outages on individual interfaces. This can, for example, allow controller to decide which direction to send an SR packet. Because this is occurring at a level close to the physical layer in the protocol stack, it can provide faster performance than what can be observed at the IP layer.

Figure 21:
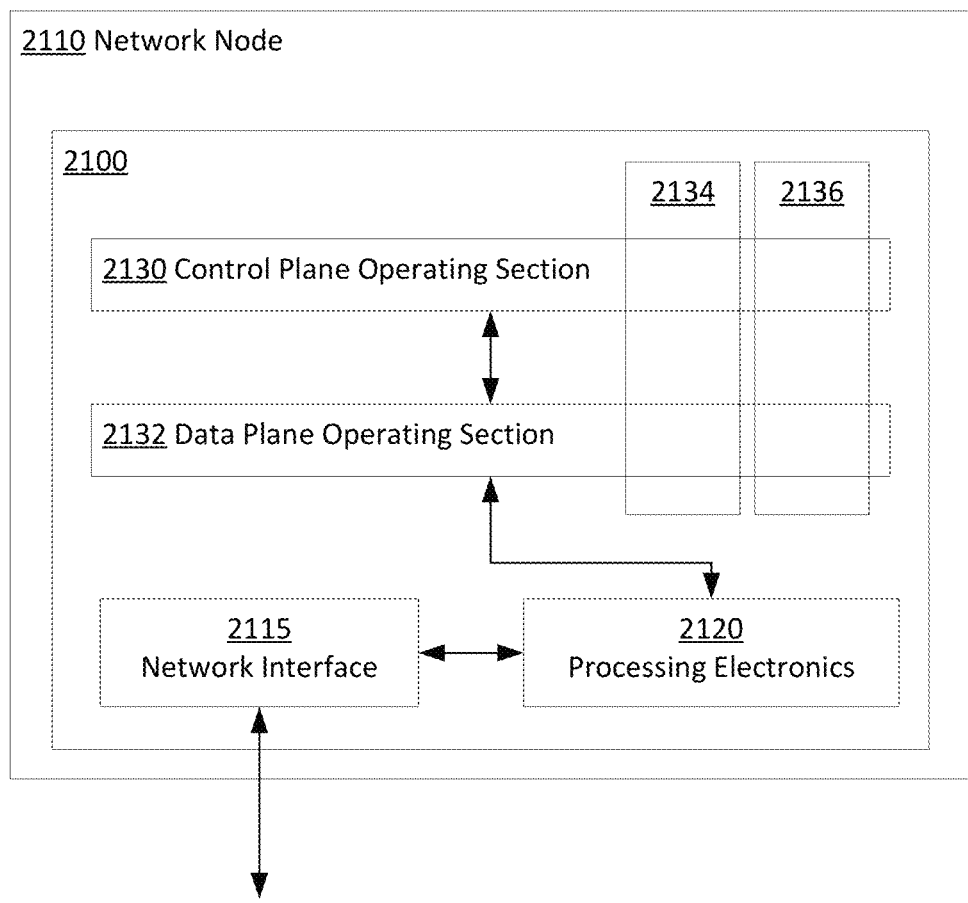
FIG. 21 illustrates a generic network node model used to illustrate embodiments.

FIG. 21 illustrates an apparatus 2100 provided in accordance with embodiments of the present invention. The apparatus is included as part of a network node 2110 of a communication network which may be a portion of a satellite used in a LEO satellite network. The apparatus includes one or more network interface 2115 (of the network node) and processing electronics 2120 which may provide access to one or more links using the same or different physical interfaces such as satellite links. The processing electronics can include a computer processor executing program instructions stored in memory. The processing electronics can include dedicated electronics, such as provided by a field programmable gate array, application specific integrated circuit ASIC), or other digital or analog electronic circuitry.

The apparatus can include a control plane operating section 2130 and a data plane operating section 2132. The control plane operating section 2130 may update routing tables and maintain representations of network topologies in response to received messages indicative of link state changes. The control plane operating section 2130 may determine when to utilize seam layer routing. The data plane operating section 2132 may receive packets and determine whether the packets are to be forwarded immediately based on address or sent to the control plane operating section for further processing. The data plane operating section may identify and send information from packets to the control plane operating section. The data plane operating section transmits packets based on routing information maintained by the control plane operating section.

In embodiments, each protocol layer, such as MAC, IP, and SR, may be seen as having a control plane. The control plane functions of the seam routing layer may interact with other protocol layers to enable transparent transfer in the case of temporary loss of adjacency across a seam of the network.

The apparatus can include a link state change operating section 2134 and a seam routing section 2136 that may detect local physical link statuses. These operating sections are aspects arising from cooperation of the control plane operating section 2130 and data plane operating section 2132. The link state change operating section 2134 operates to initiate, handle, propagate or terminate control plane messages indicative of link state changes according to a flooding protocol as described elsewhere herein. The seam routing section 2136 operates to detect, setup and manage the seam routing protocols described herein in order to provide routing between satellites adjacent to the seam or other portion of the network dynamically changing topology.

Figure 22:
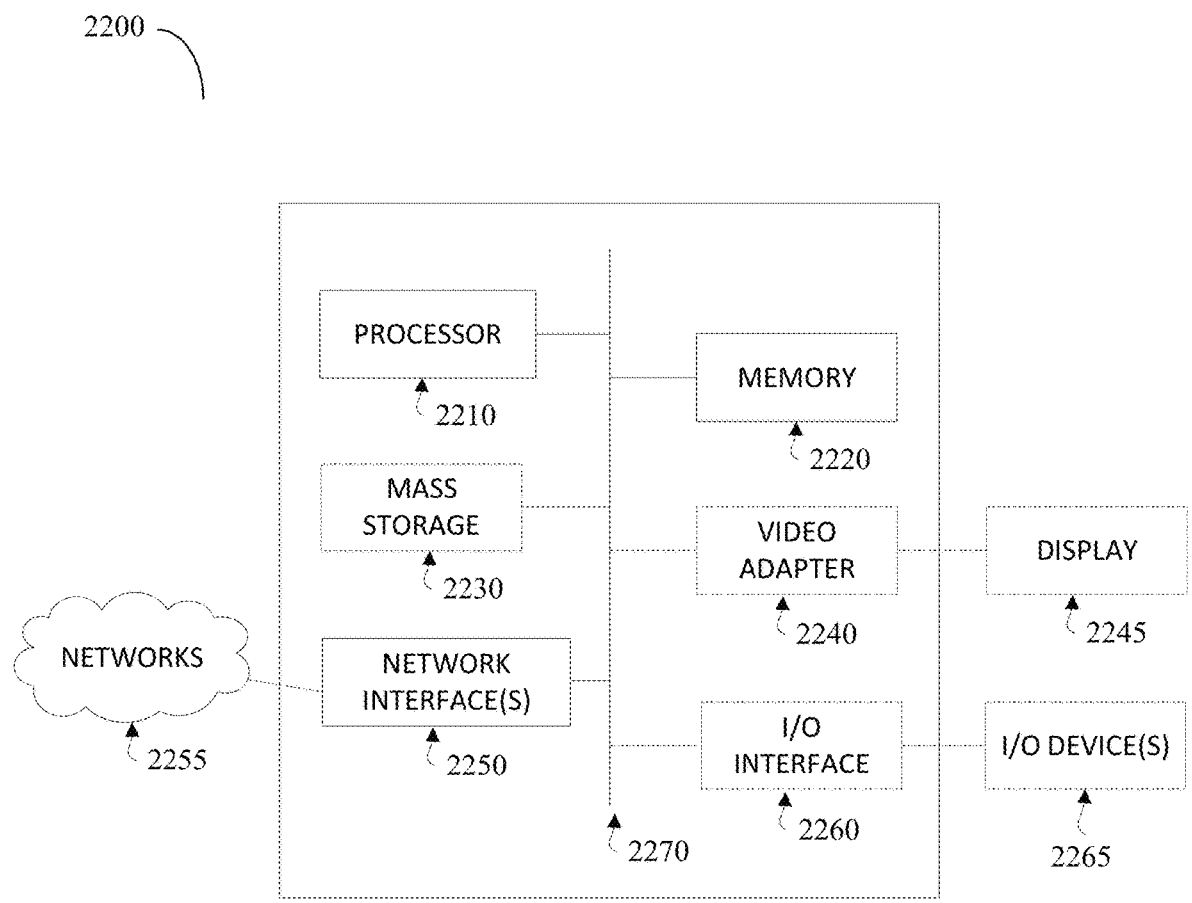
FIG. 22 illustrates a generic computing device used to illustrate embodiments.

FIG. 22 is a block diagram of an electronic device or computing system 2200 that may be used for implementing the devices and methods disclosed herein. In particular, network nodes, satellites, and ground stations may incorporate one or more computing systems 2200. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2200 includes a processor or central processing unit (CPU) 2210, a bus 2270, a memory 2220, and a network interface 2250, and may optionally also include a mass storage device 2230, a video adapter 2240, and an I/O interface 2260 (shown in dashed lines).

The processor 2210 may comprise any type of electronic data processor. The memory 2220 may comprise any type of non-transitory system memory such as static random access memory (SRAM), dynamic random access memory (DRAM), synchronous DRAM (SDRAM), read-only memory (ROM), or a combination thereof. In an embodiment, the memory 2220 may include ROM for use at boot-up, and DRAM for program and data storage for use while executing programs. The bus 2270 may be one or more of any type of several bus architectures including a memory bus or memory controller, a peripheral bus, or a video bus.

The mass storage 2230 may comprise any type of non-transitory storage device configured to store data, programs, and other information and to make the data, programs, and other information accessible via the bus 2270. The mass storage 2230 may comprise, for example, one or more of a solid state drive, hard disk drive, a magnetic disk drive, or an optical disk drive.

The video adapter 2240 and the I/O interface 2260 provide optional interfaces to couple external input and output devices to the processor 2210. Examples of input and output devices include a display 2245 coupled to the video adapter 2240 and an I/O device 2265 such as a touch-screen coupled to the I/O interface 2260. Other devices may be coupled to the processor 2210, and additional or fewer interfaces may be utilized. For example, a serial interface such as Universal Serial Bus (USB) (not shown) may be used to provide an interface for an external device.

The processor 2210 may also include one or more network interfaces 2250, which may comprise satellite links, satellite-ground links, wired links, such as an Ethernet cable, and/or wireless links to access one or more networks 2255. The network interfaces 2250 allow the processor 2210 to communicate with remote entities via the networks 2250. For example, the network interfaces 2250 may provide satellite communication via one or more transmitters/transmit antennas and one or more receivers/receive antennas.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on a computing device as contained within a network node, communications equipment, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for routing data in a network, the method comprising:
    receiving, by a first network node, data to be routed using a first layer protocol to a second network node, the first network node periodically connected to the second network node as the first network node and the second network node pass in proximity to each other based on a network topology, over a link spanning a portion of the network;

determining, by the first network node, that the link fails to meet a communications criterion;

encapsulating, by the first network node, the data using a second layer protocol to produce encapsulated data, the second layer protocol being transparent to the first layer protocol, the encapsulated data comprising connectivity instructions to route the encapsulated data to the second network node via a third network node, the second network node and the third network node being in communication across the portion of the network; and transmitting, by the first network node, the encapsulated data to the third network node;

wherein the first network node, the second network node, and the third network node are non-terrestrial.

2. The method of claim 1 wherein the network comprises a satellite network, the first network node, the second network node, and the third network node comprise satellites, and the portion of the network comprises a seam in a topology of the network.

3. The method of claim 2 wherein the first network node and the third network node are arranged within a same orbit.

4. The method of claim 3 wherein the third network node is configured to communicate only with one or more network nodes arranged within the same orbit and with one or more network nodes arranged across the portion of the network.

5. The method of claim 1 wherein determining that the link fails to meet a communications criteria comprises one of:
   determining a link failure;
   querying a controller for a status of the link; or
   querying a schedule for a status of the link, the schedule based on a relative position or a relative velocity of the first network node and the second network node.

6. The method of claim 5 wherein the first network node, the second network node, and the third network node include controllers in communication using the second layer protocol.

7. The method of claim 1 wherein the first layer protocol comprises an IP layer, and the second layer protocol is located below the IP layer and above a MAC layer.

8. The method of claim 1 wherein the second layer protocol uses MAC addresses to route the encapsulated data.

9. The method of claim 1 wherein the second layer protocol implements a tunnel between the first network node and the second network node.

10. The method of claim 1 wherein the second network node and the third network node are in communication through a fourth network node, the second network node and the fourth network node being in communication across the portion of the network, the fourth network node further encapsulating the encapsulated data and transmitting the further encapsulated, encapsulated data to the second network node.

11. The method of claim 1 wherein connectivity instructions include a seam routing header, the seam routing header comprising an address of the first network node and an address of the second network node.

12. The method of claim 11 wherein the seam routing header further comprises a seam routing type, the seam routing type including one of:
   a configuration of a satellite constellation;
   an indication that the data includes a control message; or
   an indication that the data includes an encapsulated packet.

13. The method of claim 11 wherein the address of the first network node or the address of the second network node include one of:
   an IP address,
   a seam routing layer address; or
   a MAC address.

14. The method of claim 1 wherein connectivity instructions include second layer protocol routing information of the data from the first network node to the second network node.

15. The method of claim 14 wherein the routing information is source routing information.

16. The method of claim 14 wherein connectivity instructions include a number of hops between the first network node and the second network node and an address of network nodes between the first network node and the second network node.

17. The method of claim 1 wherein connectivity instructions include second layer protocol routing information of the data from one of the first network node to the third network node, or from the third network node to the second network node.

18. The method of claim 1 wherein connectivity instructions include flags, the flags indicating one of:
   a direction of travel of the first network node;
   a direction of travel of the second network node; and
   an indication of a number of network nodes to be traversed before arriving at the link spanning a portion of the network.

19. A network comprising:
   a first network node, a second network node and a third network node, wherein:
      the first network node configured to receive data to be routed using a first layer protocol to a second network node, the first network node periodically connected to the second network node as the first network node and the second network node pass in proximity to each other based on a network topology, over a link spanning a portion of the network;
      determine that the link fails to meet a communications criterion;
      encapsulate the data using a second layer protocol to produce encapsulated data, the second layer protocol being transparent to the first layer protocol, the encapsulated data comprising connectivity instructions to route the encapsulated data to the second network node via a third network node, the second network node and the third network node being in communication across the portion of the network; and
      transmit the encapsulated data to the third network node;
      the third network node configure to receive the encapsulated data from the first network and route the encapsulated data to the second network node; and
   the second network node configured to receive the encapsulated data from the third network node,
   wherein the first network node, the second network node, and the third network node are non-terrestrial.

20. The network of claim 19, wherein the network comprises a satellite network, the first network node, the second network node, and the third network node comprise satellites, and the portion of the network comprises a seam in a topology of the network.

* * * * *